United States Patent [19]
Norin

[11] Patent Number: 5,812,773
[45] Date of Patent: Sep. 22, 1998

[54] SYSTEM AND METHOD FOR THE DISTRIBUTION OF HIERARCHICALLY STRUCTURED DATA

[75] Inventor: Scott Norin, Newcastle, Wash.

[73] Assignee: Microsoft Corporation, Redmond, Wash.

[21] Appl. No.: 679,209

[22] Filed: Jul. 12, 1996

[51] Int. Cl.⁶ .................................................. H01J 13/00
[52] U.S. Cl. ............................... 395/200.34; 395/200.78; 395/200.31
[58] Field of Search .................. 395/200.31, 200.35, 395/200.34, 200.78

[56] References Cited

U.S. PATENT DOCUMENTS

| | | | |
|---|---|---|---|
| 5,392,400 | 2/1995 | Berkowitz et el. | 395/200.33 |
| 5,408,600 | 4/1995 | Garfinkel et al. | 395/200.34 |
| 5,544,317 | 8/1996 | Berg | 395/200.65 |
| 5,577,240 | 11/1996 | Demers et al. | 395/608 |
| 5,581,753 | 12/1996 | Terry et al. | 395/617 |
| 5,596,702 | 1/1997 | Stucka et al. | 395/340 |

OTHER PUBLICATIONS

Terry et al., "Session guarantees for weakly consistent replicated data," Proceedings of 3rd International Conference on Parallel and Distributed Information Systems, IEEE Comput. Soc. Press, Sep. 1994.

Nye, Xlib Programming Manual, vol. 1, 3rd Ed. O'Reilly & Associates, Inc., 1993.

Obraczka et al., "A Tool for Massively Replicating Internet Archives: Design, Implementation, and Experience", IEEE, 1996.

Sidel et al., "Data Replication in Mariposa", IEEE, 1996.

Yavin, D. "Replication's Fast Track," *BYTE*, Aug. 1995, pp. 88a–88d, 90.

*Primary Examiner*—Lance Leonard Barry
*Assistant Examiner*—Daniel C. Patru
*Attorney, Agent, or Firm*—Workman Nydegger Seeley

[57] ABSTRACT

A system and method for replicating hierarchical data is disclosed. The system and method preferably use one-way, unacknowledged communication messages to transfer data among various servers in a computer network. In many instances replicating hierarchically structured data requires processing the data in a hierarchical fashion even though the data is received in essentially random order. Hierarchically structured data is processed in the proper order by dynamically reconstructing the hierarchy as messages are received and processed. The invention first stores received replication packets in an incoming packet store. The data is processed by creating certain structures in memory for each corresponding replication packet and then processing all entries in the structures that can be processed. Global lists are kept for entries that remain unprocessed. If entries remain unprocessed because of hierarchical dependence on unprocessed data, the structures will remain in memory for a period of time in anticipation that the parent will soon be processed. When parent data is processed, the global lists are checked for child data that can then be processed.

37 Claims, 10 Drawing Sheets

SYSTEM AND METHOD FOR THE DISTRIBUTION OF HIERARCHICALLY STRUCTURED DATA

BACKGROUND OF THE INVENTION

1. The Field of the Invention

The present invention relates to systems and methods for replication of data, that is, transferring changes (e.g., creation of new data, modification of existing data or deletion of existing data) made locally at one server to a specified list of other remote or locally connected servers. More specifically, the present invention relates to systems and methods for replication of hierarchically structured data.

2. Present State of the Art

Today, business and technology trends are changing the way we use computers and information. The personal computer or PC has become the standard business information tool as prices have decreased and computing power has increased. In record numbers, businesses are re-engineering their organizational structure and processes to become faster and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet these needs called Microsoft® Exchange.

The main concept behind Microsoft® Exchange is to provide a product that integrates E-mail, scheduling, electronic forms, document sharing, and other applications such as customer tracking to make it altogether easier to turn information into a business advantage. The result is that users can access, organize, and exchange a world of information, wherever they happen to be in the world—whether from the office, the home, or while traveling on the road. In essence, a main barrier to PC-based communication, namely, accessibility and sharing by multiple parties of up-to-the-minute information, has now been significantly reduced.

With the increased accessibility and sharing of information between multiple users, it is now more common than ever for such multiple users to simultaneously or in tandem work on shared data set objects, as for example word processing documents, spreadsheets, electronic forms, E-mail messages, graphics images or a host of other such data objects. With such shared use of data objects among multiple users of a computer network, there arises the need for each user to keep all other users of the same data object or the same set of data objects apprised of changes that are made locally by that user. This need gives rise to a process called replication of data, that is, transferring changes (e.g., creation of new data, modification of existing data or deletion of existing data) made locally at one server to a specified list of other remote or locally connected servers.

Sometimes users need to share data that is organized hierarchically. Hierarchically organized data is data that is organized in a tree structure with a top level and one or more sublevels. The top level is sometimes called the "root" and the sublevels are sometimes called "branches." For example, E-mail is often organized into hierarchically structured folders, such as:

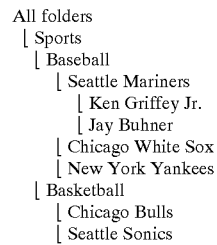

In the above example, "All Folders" is the root, and each of the other folders represents a branch at the appropriate sublevel. This type of structure is sometimes called a "folder tree." Folder trees provide an easy way to organize and group information together in logical collections. The structure can be quickly reorganized simply by moving a branch and any associated subbranches to different locations. The structure also provides ease of access since locating the desired information is quickly accomplished by traversing the branches and opening the desired folder. By showing or hiding different branches at different sublevels, the user can focus on the information he or she desires and can hide information that is irrelevant to the task at hand. Finally, folder trees provide an easy way to control the security to a list of data since the data can be grouped by security level and access can be cut off at any level. Thus a user may be able to access some levels of data, but not any levels below.

The use of this type of hierarchically structured data is not limited to the folder tree of an E-mail system. Many other applications utilize hierarchically structured data. For example, directories on a computer disk are often organized hierarchically, with a main root directory and one or more levels of subdirectories.

When users desire to share hierarchically structured data, a mechanism must be in place to allow replication of hierarchically structured data. Unfortunately, replication of hierarchically structured data can present many problems. Data replication is usually geared to ensure that multiple copies of data are synchronized among multiple systems. When any system is accessed by a user, the copy of the data stored on that system will be the same as the copy stored on any other system. In order to achieve this goal, many replication systems send changes as they occur to the other systems having a copy of the data. For example, if two systems, A and B, had a copy of a particular set of data and the set on system B changed, the replication engine would, through some mechanism, ensure that the copy on system A was updated to incorporate the changes made on system B. These changes are often sent chronologically as they occur.

Sending changes in chronological order can create problems when dealing with hierarchically structured data. For example, suppose a user created folder F1 on system B. The user then created folder F2 as a subfolder of F1. Finally, the user changed the name of folder F1 to F5. At the end of the change cycle, the folder tree would be:

Now suppose a second system, C, was receiving the changes from system B. For various reasons it is possible that system C would receive the change to create folder F2 before the change to create folder F1 or to modify the name of folder F1 to F5. For example, if there were numerous changes, it is possible that the changes would be broken up into multiple messages. Then due to routing delays, the messages could be received out of order. Perhaps some of the messages could be lost so that the message to create F1 was never received. In such a situation, system C would not be able to create folder F2 because it does not have any place to "hang" folder F2, since folder F1 (or F5) does not yet exist. This simple example, however, highlights one major feature of hierarchically structured data; changes affecting the structure of the tree (creating the folder tree, for example) must be processed in hierarchical order. However, due to a variety of factors, messages affecting the structure of the tree may not be received in hierarchical order.

Several possible solutions could be devised to prevent messages from being received out of hierarchical order. One popular class of replication systems rely on every system talking explicitly to every other system. This approach, generally referred to as "point-to-point" replication, requires a fully connected replication topology. A fully connected replication topology in turn requires a physical communication link between a system and each and every other system in the network. Such a fully connected replication topology allows a single system to talk to each and every other system directly. If each system talks to every other system directly, the two systems can guarantee that the messages are transferred and received in hierarchical order and that no messages are lost.

In a point-to-point replication system, when a system has information which should be replicated, the system initiates a two-way communication dialog with each and every other system in the replication topology, one after the other. During the dialog, the system transferring information will send the information to the recipient system and then wait for the recipient system to acknowledge proper reception of the transferred data. When all data has been transferred and acknowledged in this manner, the system will then break the communication dialog and initiate another communication dialog with the next system in the replication topology.

Point-to-point replication systems work quite well with small replication enterprises. However, as is apparent from the above description, point-to-point replication is message intensive and requires a large communication bandwidth between systems. Thus, as the number of systems in the replication enterprise grows, the point-to-point replication process degrades rapidly and the network capacity is soon exceeded. Because of this characteristic, a point-to-point replication system is generally considered to be unworkable for a replication enterprise with a large number of systems. With the explosive growth of large scale networks which may contain hundreds, thousands, or possibly hundreds of thousands of systems, such an approach is of limited value.

In order to overcome some of the limitations of a point-to-point replication system, other replication systems which rely on a specific replication topology have been developed. One such replication topology utilizes a central server or "hub" connected to a plurality of other systems sometimes called satellites. In such a method, when a satellite has information to be distributed to other satellites connected to the hub, the system transfers the message to the hub and allows the hub to distribute the information to the other satellites. As the number of systems in the network increases, more hubs are added. The hubs are then interconnected so that data may flow from a satellite connected to one hub, to another satellite connected to a separate hub. Although the use of hubs and specially configured topologies helps alleviate some of the problems encountered in a point-to-point replication system, such systems introduce the problems of message routing, lost messages and so forth that can cause messages to be received out of hierarchical order.

What is needed is a system and method for replicating hierarchically structured data that does not depend on the type of networking connections between systems. Furthermore, what is needed is a system and method of replicating hierarchically structured data that is robust enough to handle situations where messages are lost during transmission and where messages received out of hierarchical order can be properly processed.

SUMMARY AND OBJECTS OF THE INVENTION

1. Glossary of Terms

In order to assist in more easily understanding the terminology used in the following detailed description and summary of the invention, the following definitions for key terms is provided:

Asynchronous store and forward replication: A process of replicating data throughout a network or enterprise by broadcasting locally made changes (e.g., creation of new data, modification of existing data, or deletion of existing data) to a specified list of servers (called replica nodes) which contain copies of the data. Communications in store and forward replication are one-way and there is no acknowledgment of receipt of messages containing the changes.

Backfill: A discovery based data recovery process by which changes held by other servers (called replica nodes) but not held locally are recovered so that the copy of the data set (called a replica) held locally is the same as replicas held by other replica nodes.

Change number: A unique identifying code used to identify a particular change made to a particular data object by a particular replica node.

Change range: A range of changes, identified by a minimum and maximum change number. The change range is inclusive of the minimum and maximum change number.

Change set: The set of change ranges that defines the changes available for a given replica of a data set on a given replica node. The change set contains changes made on the local replica node and changes to the data set received from other replica nodes through the replication process.

Data set: A set of objects which can be replicated. In one sense a data set can be thought of as a container with various data set properties which holds or stores data objects, much like a folder contains documents. A populated data set includes both data set properties and the data objects for the data set, while an unpopulated data set does not have any associated data objects and only refers to the data set properties.

Data set list: A list of the data set properties for the data sets being replicated across the enterprise. In one sense a data set list can be thought of as a container which holds or stores data sets (as defined by their data set properties) in much the same way that a data set is a container that stores data objects. Thus, a data set is a container that holds data objects while a data set list is a container that holds data sets (the set of data sets).

Data set properties: A set of information that describes and defines a data set. Data set properties can include such information as a name and/or ID value, a list of servers which have the contents of a data set (the replica list), a change number, a time last modified property, a parent property for hierarchically structured data, a property that points to the local storage of data objects contained in the data set, and any number of other properties useful for a variety of purposes.

Enterprise: The set of servers (or replica nodes) comprising the replication environment.

Replica: A local copy of a particular data set replicated on one or more replica nodes throughout the network.

Replica list: A list of all replica nodes on the network containing a replica of a particular data set.

Replica node: A server or other location on the network where a copy of a data set (called a replica) or other replica object resides.

Replica object: An object or group of objects that can be replicated. This term includes at least, individual data objects and data set properties. Data objects and data sets are defined by their properties. For example an E-mail message (one type of data object) is defined by such properties as a "to" property, a "from" property, a "message body" property, one or more "attachment" properties, and so forth. An example of data set properties has been given previously. A replica object is therefore a group of properties that define an object that can be replicated.

Site: A plurality of replica nodes in which each node is relatively similar in terms of cost to access data, as compared to the cost between sites. Cost is representative of factors such as the monetary cost to obtain data, the speed of obtaining data, and the reliability of obtaining data.

2. Brief Summary

The foregoing problems in the prior state of the art have been successfully overcome by the present invention, which is directed to a system and method for replication of hierarchically structured data. The system and method of the present invention can be used with virtually any type of replication process. The preferred replication process, however, is an asynchronous store and forward replication process.

In a store and forward replication process, each server keeps track of locally made changes to a particular copy of a data set (sometimes referred to as a "replica") which contains one or more data objects. Each server periodically broadcasts one or more replication packets containing the new locally made changes (since the last replication broadcast) to all other servers with a copy of the same data set. The group of other servers also having a copy of the data set is kept on a "replica list." The changes are preferably broadcast in the form of updated copies of the changed data objects. This allows each server to update the local replica as changes are received by replacing the older data objects with the newer data objects. In the same broadcast, the server also includes the "change set" available for the local copy of the data set on the server. A "change set" is basically a list of changes that have been made to the local copy of the data set and includes not only those changes made locally by the server but also those changes received from other servers on the replica list.

A store and forward replication process also replicates "data set properties" to other servers. The replication of data set properties occurs independently of the replication of the data objects in the data sets. Replication of data set properties occurs in the same manner as replication of data objects. The local server periodically broadcasts one or more replication packets containing the new changes that have occurred since the last data set property replication broadcast. The changes are preferably broadcast in the form of changed data set properties so that servers receiving the changed data set properties can update their local copy of the properties. The replication packets can contain change sets and other information as appropriate. The replication of data set properties, either with or without the associated data objects, allows the servers receiving the properties to keep a "data set list" of all data sets in the enterprise and the locations where populated copies of the data sets may be found.

A store and forward replication process utilizes existing networking hardware and/or control software as a transport system to deliver one-way, unacknowledged messages between servers within a replication enterprise, much like E-mail messages are delivered between users of computer systems. Because the messages sent between systems to replicate data are one-way, unacknowledged messages, the possibility exists that one or more of the changes contained in the replication package may be lost. This leads to a process to recover lost or missing data from a local copy of the data set. This process, sometimes referred to as "backfilling," is accomplished by keeping track of the changes that have been made locally or have been received through the replication process. These changes are stored in a local change set. (As previously described, the local change set is broadcast with replication messages.) By comparing the local change set with the change sets received from other servers through replication messages, a server can discover what changes are missing from its local copy of the data set and which servers can provide those changes. Once a server discovers changes missing from its local copy of the data set, the server can request the missing changes from one or more other servers that have the desired changes.

The present invention provides a way of processing received replication packets in a hierarchical fashion regardless of the order in which they are received. The present invention also works with the backfill process to ensure that lost replication packets recovered by the backfill process are also properly processed.

As replication packets are received, they are stored in an incoming packet store to await processing. The incoming packet store is preferably some form of persistent storage, such as a magnetic disk, so that if the system experiences an abrupt failure, recovery can proceed in an orderly fashion without the need to recover data already received. To process received replication packets, the incoming packet store is scanned and a replication packet selected for processing based on its replication packet type. Packets containing hierarchically structured data (such as packets containing data set property information) are processed before processing replication packets without hierarchically structured data.

Once a replication packet has been selected for processing, an information object associated with the selected replication packet is created in memory. The information object will have one entry for each change received in the selected replication packet. The information object and the selected replication packet are related and processing the entries in the information object will result in processing the changes in the selected replication packet. Rather than copy all of the information from the selected replication packet into the information object stored in memory, certain large amounts of information may be left in the selected replication packet and retrieved through the information object at the appropriate time. Such a scheme minimizes the amount of memory required to process large amounts of information while providing quick access and processing to necessary information.

Received replication packets containing hierarchically structured data may contain changes relating to deletion of existing data, creation of new data, or modification of existing data. Changes relating to the deletion of existing data are sometimes referred to as "deletes". Changes relating to the creation of new data are sometimes referred to as "creates". Changes relating to the modification of existing data are sometimes referred to as "modifies". In the present invention changes relating to deletion of data are processed prior to changes involving creation or modification of data. Processing "deletes" first may make processing "creates" or "modifies" unnecessary, as when the modification and delete of a single data set are received in the same replication packet.

In a hierarchy, such as a folder tree, while creates must be processed from the top down, deletes must be processed from the bottom up. In the present invention, deleting a parent data set will not automatically cause deletion of any child data sets. This is necessary to prevent inadvertent loss of data in the enterprise. Thus, in order to cleanly delete a parent data set, the parent data set must have no undeleted child data sets. To process deletes, the present invention repeatedly scans the information object and processes changes deleting data sets without undeleted child data sets. As long as a data set is deleted on a pass, one more pass is made through the information object to see if deletion of that data set has enabled the deletion of another data set.

Once all data sets without undeleted child data sets have been processed, what remains are data sets that should be deleted but have undeleted child data sets that are preventing the delete from occurring. In order to enable the deletion of these data sets, any undeleted child data sets are promoted to the level of the parent and the parent is deleted. While this creates a change in the hierarchy, such a change is necessary to avoid data loss. The present invention is structured so that all servers will create the exact same change in the hierarchy so that the hierarchy stays synchronized across the enterprise, with each server having an identical copy of the hierarchy. In most situations the change is only temporary because the child is usually deleted by a later received replication packet.

During the delete processing, when a data set is deleted, any creates or modifies associated with that delete are removed without processing.

After the deletes have been processed, the creates and modifies are processed. Creates and modifies are processed by attempting to process each entry in the information object. If an entry cannot be processed due to a hierarchical dependence on an unprocessed change, processing of the entry is deferred by skipping the entry. If an entry is successfully processed, the entry is zeroed to indicate that it has already been processed. Unprocessed entries in all information objects in memory are then checked to determine if the entry just processed was the parent of any of the unprocessed entries. If so, then processing of those entries is enabled. By checking each processed entry against the unprocessed entries for a parent-child relationship, the entries can be processed in a top down fashion. Global indexes and tables, which may be stored in memory, can be used to help facilitate the process of locating parent-child relationships.

When all entries in an information object have been processed, the information object and the associated replication packet are removed and the locally stored change set is updated to include the entries successfully processed. If an unexpected error occurs during processing, as many of the entries that can be processed are processed. The information object and associated replication packet are then removed, but the locally stored change set is not updated. This will result in backfilling the changes associated with the error, and another attempt to process the changes can be made. This gives the system time to fix whatever the error might have been, such as out of disk space, low memory, etc.

Timeout values may be assigned to information objects to ensure that they do not remain in the system for an indeterminate period of time. If an information object times out, the information object and associated replication packet are removed. This will result in backfilling of the packet at some future time, at which time another attempt to process the changes can be made. Again the time delay may have allowed whatever was delaying processing of the packet to be fixed.

In one embodiment, timeout values of various packets having portions of the hierarchy may be synchronized so that no portion of the hierarchy is removed until all portions are removed. This provides the maximum possible likelihood that the information will be available to process the hierarchy in the proper order. A mechanism is also provided to prevent timeout of an information object while entries are being processed. This mechanism can be extended to all portions of the hierarchy so that no portion of the hierarchy can time out as long as some portion of the hierarchy is being processed. This feature further increases the likelihood that the information necessary to process the hierarchy in proper order will reside on the server. Finally timeout values can be synchronized with any pending backfill requests. This will prevent the backfill requests from timing out while information that fills or partially fills the request is waiting to be processed.

In another embodiment timeout values are not synchronized, but are assigned a relatively long value. In this embodiment the timeout values of the received packets and the timeout values of pending backfill requests operate independently. However, data that has been received, but not yet fully processed may be removed from backfill requests so that the same data is not requested twice.

Accordingly, it is a primary object of this invention to provide a system and method for replication of hierarchically structured data that properly replicates data across a computer network.

Another primary object of the present invention is to provide a system and method for replication of hierarchically structured data that processes received information in the proper order regardless of the order in which the data is received.

Another important object of this invention is to provide a system and method for replication of hierarchically structured data that takes advantage of currently installed network hardware and network configurations.

Another important object of the present invention is to provide a system and method for replication of hierarchically structured data that accomplishes replication of hierarchically structured data without inadvertent data loss.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
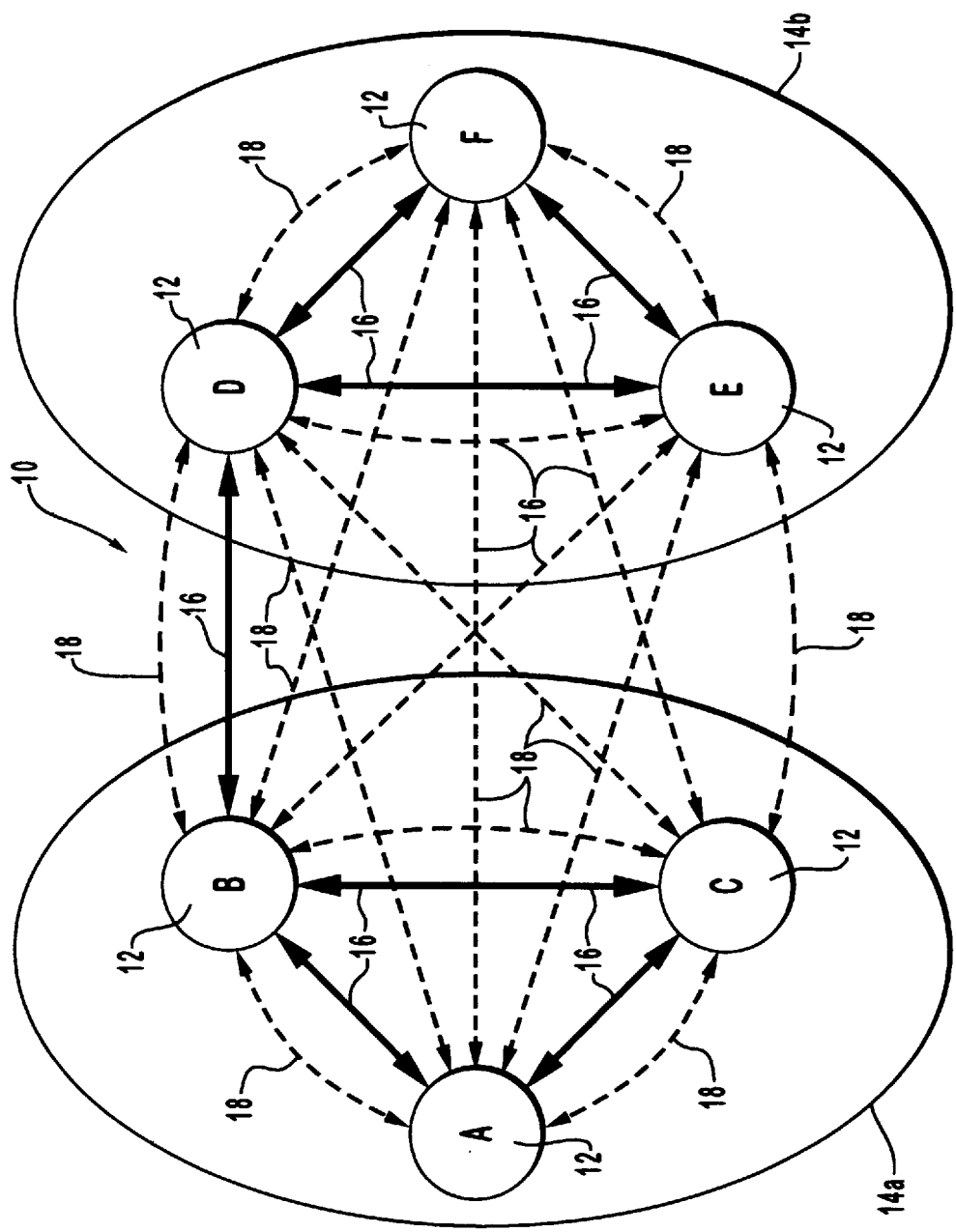
FIG. 1 is a representation of the topology of an example replication enterprise.

The following description of the present invention is presented by using flow diagrams to describe either the structure or the processing of presently preferred embodiments to implement the systems and methods of the present invention. Using the diagrams in this manner to present the invention should not be construed as limiting of its scope. The present invention contemplates both methods and systems for replication of hierarchically structured data. The presently preferred embodiment for implementing a system for replication of hierarchically structured data comprises a general purpose computer. The currently disclosed system, however, can also be used with any special purpose computer or other hardware system and all should be included within its scope.

Embodiments within the scope of the present invention also include articles of manufacture comprising programs storage means having encoded therein program code means. Such program storage means can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above should also be included in the scope of program storage means.

Program code means comprises, for example, executable instructions and data which cause a general purpose computer or special purpose computer to perform a certain function or a group of functions.

1. Summary of Store and Forward Replication

The system and method for replication of hierarchically structured data of the present invention as disclosed herein can be utilized with almost any type of replication process. However, the systems and methods of the present invention do require some sort of replication process. The presently preferred type of replication process is a store and forward replication process. An understanding of the basics of store and forward replication is helpful in understanding the details of the present invention. For a detailed discussion of store and forward replication, see copending U.S. patent application Ser. No. 08/673,741, entitled "System and Method for Asynchronous Store and Forward Data Replication" (hereinafter referred to as the "Store and Forward Application"), which is incorporated herein by reference. Asynchronous store and forward replication, or simply store and forward replication, is designed to utilize existing network hardware, networking control software, and networking configurations as a transport system to deliver at least one-way unacknowledged communications between systems in a replication enterprise. In the context of this application, networking hardware and any associated networking control software which performs this transport function will be referred to as the Message Transport Agent (MTA). One-way, unacknowledged communication means that the store and forward replication process delivers a message to be transferred to the MTA and does not receive feedback as to the success of the transfer. Primarily for efficiency reasons, the systems and methods that are the subject of this invention and the invention described in the copending Store and Forward Application have been designed with the presumption that no acknowledgement or feedback is required. The concepts disclosed in this application and in the copending Store and Forward Application, however, could be modified to use any status information available from the MTA. Similarly, the concepts of this invention could be used with virtually any type of replication system with appropriate modification. However, a store and forward replication system provides the presently preferred context of this invention.

Turning now to FIG. 1, an example of a network over which data is to be replicated is shown generally as 10. In this application, such a network will be referred to as a "replication enterprise" or simply an "enterprise." In a store and forward replication process, a given populated data set (data set properties with associated data objects), a copy of which is referred to as a "replica," and/or a given unpopulated data set (data set properties without associated data objects), is replicated at one or more locations in the enterprise. In FIG. 1, the locations where a replica or a copy of an unpopulated data set can reside are referred to as "replica nodes" and are shown as 12 and labeled A through F. The term "replica node" is preferred over the term "server" since "server" often implies a system which serves one or more desktop, laptop, or other computers. Replica nodes include not only servers in a traditional sense of the term, but also desktop, laptop, or any other system where a copy of a populated or unpopulated data set may reside. In the context of this invention, "replica" will be used to refer to a specific copy of a set of one or more data objects which are to be replicated as a unit across one or more replica nodes. The terms "replica" and "data objects" are intended to be read broadly and encompass any type or format of data to be replicated. "Unpopulated data set" refers specifically to data sets without their associated data objects. The term "replica object" will be used to refer broadly either to a populated or unpopulated data set or to an individual data object or an individual set of data set properties.

In the enterprise, replica nodes may be grouped into "sites." A site is a plurality of replica nodes with relatively similar costs to access data. Replica nodes within a site are generally, but not necessarily, located in a relatively localized geographic area and have high connectivity between nodes, such as, for example, Local Area Network (LAN) connections. The cost to access data between sites is generally much greater than the cost to access data within a site. Site groupings are typically assigned by an administrator. FIG. 1 shows two sites, designated 14a consisting of replica nodes A, B, and C, and 14b consisting of replica nodes D, E, and F.

Replica nodes are connected by physical network connections. In FIG. 1, the physical network connections 16 are illustrated by solid arrows. As shown in FIG. 1, replica nodes 12 may not be fully connected by physical network connections 16 (note that the site containing the A, B, C, group is connected to the site containing the D, E, F, group by only a single link.) For store and forward replication, however, all that is required is the physical connections be sufficient to provide a data flow path between each of the replica nodes. Furthermore, physical connections 16 may be of any type, for example, the physical connections between replica nodes A, B, and C may be a LAN or other high-speed link while the connections between the connections between replica nodes D and B may be a slower dial-up, internet, Wide Area Network (WAN), or other long-haul connection. All such connections are examples of networking means for interconnecting replica nodes.

By ensuring a data flow path between each of the replica nodes, the entire enterprise is logically fully connected even though physical connections are of arbitrary topology. In FIG. 1, the logical network connections forming the fully connected logical topology are illustrated by dashed arrows 18.

In a store and forward replication system, each replica node keeps track of all changes made locally to a replica object. Each replica node then periodically broadcasts new locally made changes that have occurred since the last replication broadcast through the MTA to all other replica nodes having a copy of the replica object. Store and forward replication can be used to distribute both populated and unpopulated data sets. This is done by replicating the contents of data sets (data objects) and the properties that define data sets (data set properties). Data replication in a store and forward replication enterprise can be thought of as the distribution of copies of the contents of a container. In the case of a data set, the contents are the individual data objects that make up the data set and the replication system distributes changes made to the data objects. In the case of the data set list, the contents are the individual data set properties that define each data set.

The relationship of the data set list, the data sets, and data objects, can be illustrated as follows. Each replica node keeps a list of the data sets (whether populated or unpopulated) that it knows about. Usually every replica node in the replication enterprise knows about all data sets in the enterprise. The data set list can be illustrated as:

| Data Set List |
| --- |
| Data Set No. 1 |
| Data Set No. 2 |
| . |
| . |
| . |
| Data Set No. n |

Each data set is defined by a set of properties. This set of properties is often collected together in a property object. These properties describe or define important features of the data set. Each entry in the data set list comprises the data set properties of a data set. For example, in one preferred embodiment, each data set (and each entry in the data set list) comprises:

| Data Set Name | Data Set ID | Parent Data Set ID | Change Number | Time Last Modified | Predecessor Change List | Replica List | Pointer to Data Objects |
| --- | --- | --- | --- | --- | --- | --- | --- |

The data set name is a common name for the data set that is displayed to users. The data set ID is an identifier that uniquely identifies the data set across the replication enterprise. Any type or form of ID will suffice for this purpose. For example, if the enterprise had synchronized clock values available, each ID could be drawn from the globally synchronized clock value or have the globally synchronized clock value as part of the ID. As another example, one of the replica nodes in the enterprise could be responsible for issuing ID values to all other replica nodes. Other methods could be developed and any method will work. All that is required is the ability to distinguish one replica node from another. One presently preferred method involves generating a Globally Unique ID (GUID) and concatenating it with a local counter value to form a Fast Unique ID (FUID). A GUID is a unique 16 byte value created by concatenating a 60 bit system value, a 4 bit version number identifying which version of the ID generating program is used, a 16 bit clock sequence number that is incremented every time an ID is assigned, and a 48 bit network address drawn from the network hardware of the replica node. A FUID is formed by concatenating a GUID value with a local counter value that is incremented every time an ID value is assigned. More details of generating GUIDs and FUIDs can be found in the Store and Forward Application, previously incorporated by reference.

The parent data set ID pertains specifically to hierarchically structured data sets and is a unique identifier of the parent data set. Again, any type or format of identifier will work as long as the identifier is unique across the enterprise. In one preferred embodiment, the change number is a FUID.

It is the parent property that makes the data set hierarchically structured. Other properties may also be included which give more information about the data set. For example, it may be desirable to store the complete path of the data set. The path of the data set describes the data set's location relative to the root. In the example given previously of:

```
All folders
 | Sports
  | Baseball
    | Seattle Mariners
      | Ken Griffey Jr.
      | Jay Buhner
    | Chicago White Sox
    | New York Yankees
  | Basketball
    | Chicago Bulls
    | Seattle Sonics
```

The path of Jay Buhner is: All folders\Sports\Baseball\Seattle Mariners\Jay Buhner. Note that the "\" character is simply a separator and any character can be used in its place. Data sets which are not hierarchically structured may not have any of these properties.

The change number is an identifier that essentially acts as a version number for the data set properties. A new change number is assigned when the data set properties are changed. Any type or format of identifiers may be utilized for the change number as long as each change number is unique across the enterprise. In one preferred embodiment, a FUID is used for the change number.

The time last modified is the local time that the properties were last modified. The predecessor change list is essentially a change history of the data set properties. The time last modified and the predecessor change list are useful in recognizing and resolving conflicts between two different copies of properties for the same data set. Conflict resolution and detection is covered in greater detail in U.S. patent application Ser. No. 08/673,161, entitled, "System and Method for Distributed Conflict Resolution Between Data Objects Replicated Across a Computer Network" (hereinafter the "Conflict Resolution Application"), incorporated herein by reference.

The replica list is the list of replica nodes having a copy of a populated version of the data set. The replica list acts as a distribution list for replication packets containing changes to the contents of a data set. The replica list may also contain other information, such as a replica state indicating the level of participation of each replica node on the list in the replication of the data set. Although not a specific part of this invention, further details of the replica state and its use can be found in copending U.S. patent application Ser. No. 08/679,054, entitled "Replica Administration without Data Loss in a Store and Forward Replication Enterprise" (hereinafter the "Replica Administration Application"), incorporated herein by reference.

Although not typically utilized, it would also be possible to have distribution lists for various data set properties. In this way, the location (and even existence) of certain data sets could be kept hidden from certain replica nodes. In conjunction with security measures which restrict access to hidden data sets, the ability to hide data sets from certain replica nodes may be useful in situations where certain users only access the enterprise through a limited number of replica nodes and access to certain data sets by these users is to be restricted. Collectively, the distribution lists used for either data objects or data set properties are referred to as "replica object distribution lists."

Finally each entry in the data set list may have a pointer to a list of data objects. This list of data objects is the contents of the data set. For replica nodes having a populated data set, the pointer will point to the list of data objects. For replica nodes having an unpopulated data set, the pointer will be null.

To further illustrate the replication of populated and unpopulated data sets, consider that one replica node might receive only replication packets containing data set properties. Assuming that this replica node received the replication packets containing data set properties for all data sets in the enterprise, this replica node will then have a copy of the data set list (or "set of data sets") available in the enterprise. The data objects associated with each entry in the data set list are not available locally, however. This replica node has unpopulated data sets. Another replica node may receive both replication packets containing data set properties and replication packets containing data objects. Assuming that this replica node received all such replication packets, this replica node has copies of both the data set list and the data objects associated with each entry in the data set list. This replica node has populated data sets. It is rare that a replica node has either all populated or all unpopulated data sets. Typically, a replica node will receive replication packets containing data set properties for all data sets and replication packets containing data objects for some data sets. These replica nodes have a complete data set list with some populated data sets and some unpopulated data sets.

2. Summary of Discoveay-Based Data Recovery

Because messages sent via the MTA to other replica nodes are one-way, a mechanism is usually put in place to ensure that all replica objects throughout the enterprise are synchronized, or in other words, are up-to-date. If a new replica node is added to the replica object distribution list of a replica object, either because the replica node just came on line or because a decision was made to send the replica object to a new node, this mechanism must quickly and efficiently allow the replica node to receive changes to the replica object that happened before the replica node was added to the replica object distribution list. Furthermore, if messages are lost or not received properly through the MTA, then the mechanism must be able to quickly and efficiently recover the lost data. These situations are typically addressed by a data recovery mechanism like that described in copending U.S. patent application Ser. No. 08/670,588, entitled "System and Method for Discovery Based Data Recovery in a Store and Forward Replication Process" (hereinafter referred to as the "Backfill Application", incorporated herein by reference.

Figure 2:
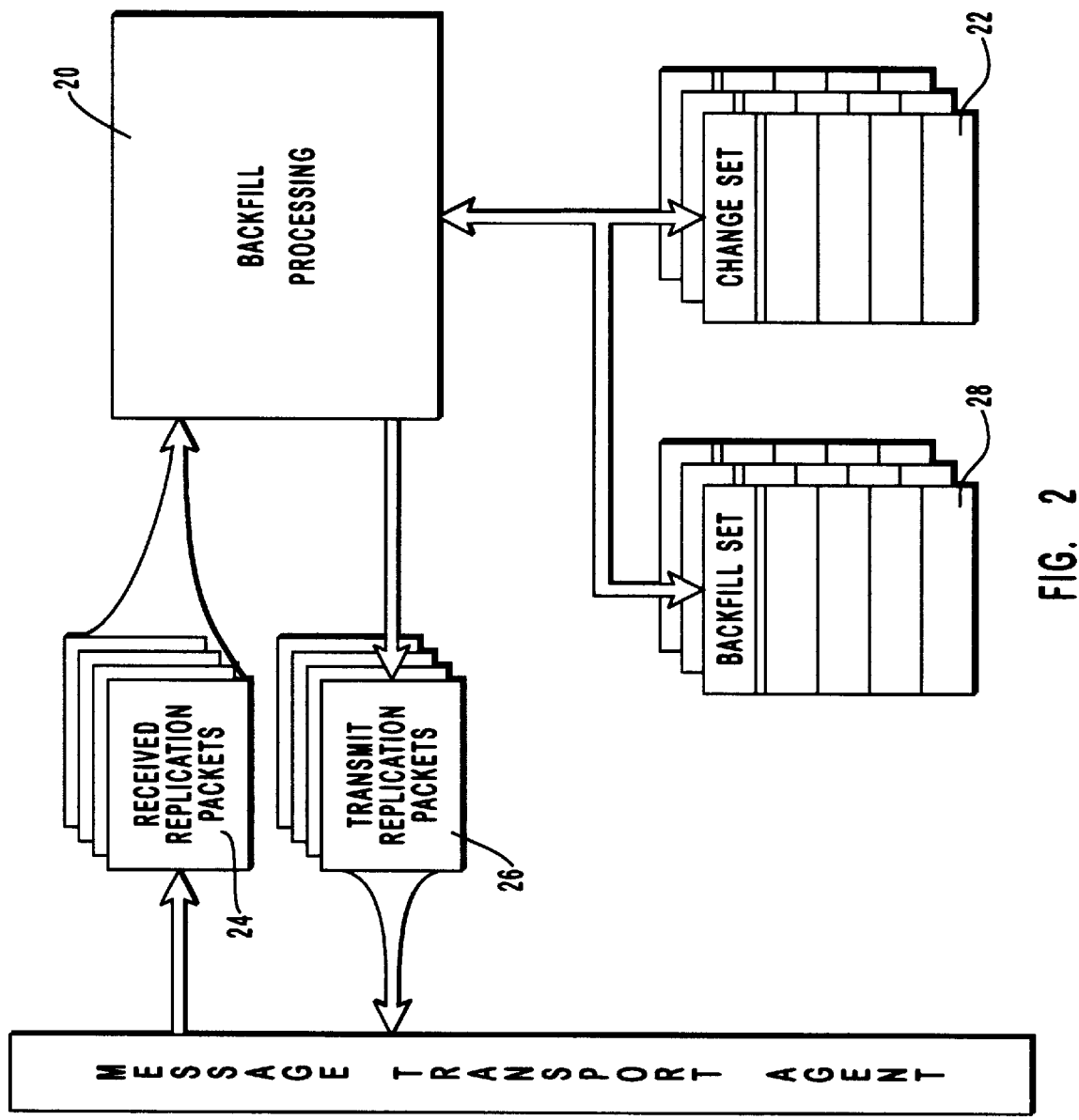
FIG. 2 is a simplified diagram representing an example discovery based data recovery process.

FIG. 2 presents a greatly simplified high-level, block diagram of a discovery based data recovery process like that described in the copending Backfill Application. In FIG. 2 the discovery based data recovery process is illustrated by backfill processing block 20. As changes are made to the local copy of a data set, the changes are identified by a unique identifier such as a change number, as explained previously. The change numbers associated with the changes to the data set that have been replicated to other replica nodes in the enterprise are stored in a local change set such as change set 22. One change set is kept for each copy of a different data set on the replica node. As changes are received from other replica nodes in the enterprise and successfully processed, the change numbers corresponding to those changes are also stored in the change set associated with the data set. Thus, the local change set, as for example change set 22, contains changes made locally that have been replicated to other replica nodes in the enterprise, and successfully processed changes received from other replica nodes in the enterprise.

The changes stored in the local changes sets are broadcast to other replica nodes in the enterprise. As explained in the copending Backfill Application, previously incorporated by reference, change sets may be included in a wide variety of packet types. These packet types are illustrated in FIG. 2 by received packets 24 and transmit packets 26. For example, in the Backfill Application four different packet types are used. Data request packets are used to request data missing from the local replica node from other replica nodes with the data. Data packets are used to fill data requests. Data packets are also used by the replication process to distribute changes made to a replica object. Information packets are used to broadcast status information such as the local change set. Information request packets are used to request status information, such as the change set of another replica node. More information about the types and uses of the various transmit and receive packets is contained in the copending Backfill Application and the copending Store and Forward Application.

In addition to the other uses of these packets, they also provide a way to distribute the local change set to other replica nodes in the enterprise. When a change set for a particular data set is received from other replica nodes in the enterprise, backfill processing block 20 compares the received changed set to the corresponding locally stored change set. By comparing the two change sets, any information contained in the received change set but missing from the local change set can be identified. The differences in the received change set and the locally stored change set thus identify changes that are held by another replica node but which are not held locally.

If backfill processing block 20 identifies changes that are held by other replica nodes but which are not held locally, backfill processing block 20 then undertakes a process to recover the missing data from replica nodes that have the relevant data. Changes that are held by other replica nodes but which are not held locally are entered into backfill set 28. The entries in the backfill set can then be used to generate messages which are sent to one or more other replica nodes requesting the missing changes. As those requests are filled and successfully processed, the entry can be removed from backfill set 28 and added to change set 22. Further details of the backfill process are described in the copending Backfill Application, previously incorporated by reference.

3. Description of Hierarchical Data Replication

Figure 3:
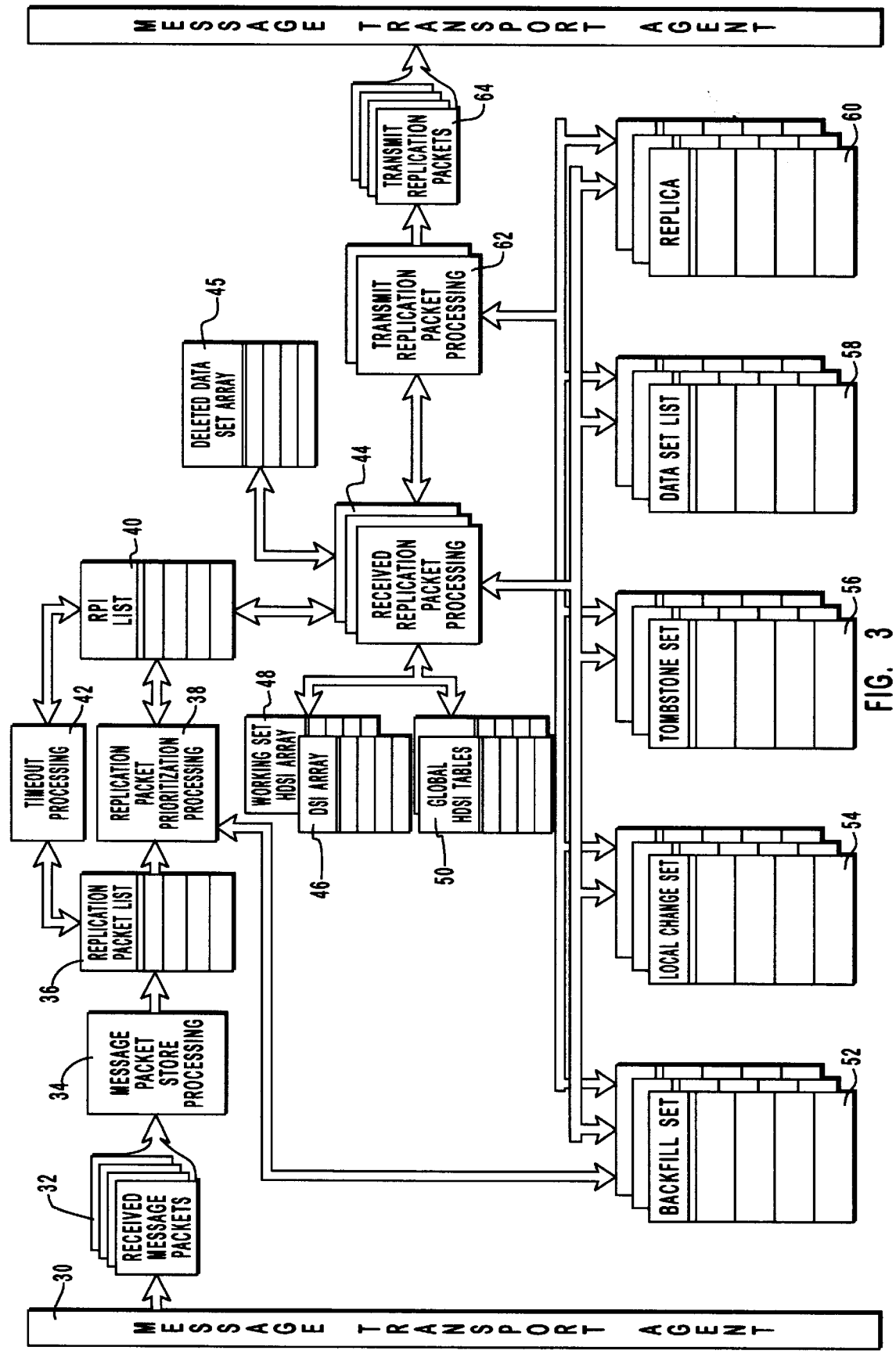
FIG. 3 is a simplified diagram representing an example system and method for replicating hierarchically structured data.

Referring next to FIG. 3, one embodiment of a system for replicating hierarchically structured data is presented. In the system, messages are received through networking means for interconnecting a plurality of such systems together. In FIG. 3, such networking means is illustrated by MTA 30. As previously described, MTA 30 can comprise any networking hardware and any associated networking control software. The minimum capability is for the MTA to deliver one-way unacknowledged messages between systems. This is in accordance with the preferred store and forward replication environment. Various message packets, as for example received message packets 32, are received via MTA 30. These message packets may include replication packets as well as other types of messages. A computer system performing the method of the present invention may also be running a variety of other types of programs. These programs may also use MTA 30 for communication. Thus embodiments within the scope of this invention may comprise means for distinguishing replication packets from other message packets. Any method of distinguishing replication packets from other message packets will work. For example, a recognizable identifier could be included in replication packets. As a further example, if the replication process is implemented using an E-mail type transport, then packets addressed or sent directly to the replica node instead of a user may be identified as replication packets.

Because replication packets containing hierarchical data must be processed in hierarchical fashion, embodiments of the present invention may comprise means for storing incoming replication packets until they can be processed. By way of example, and not limitation, in FIG. 3 such means may comprise message packet store processing block 34. By way of further example, such means may comprise replication packet list 36. Message packet store processing block 34 takes the received message packets, such as received message packets 32, identifies the replication packets and places them in replication packet list 36. Replication packet list 36 is an incoming packet store that holds the incoming replication packets until they can be processed.

As previously discussed, many different types of replication packets can be used by the replication system to accomplish its functions. This invention, however, relates to replication of hierarchical data. The primary replication packets of concern for this application, then, are replication packets that contain data. More specifically, this invention concerns the exchange and processing of replication packets that contain hierarchically structured data. Such packets are usually, but not necessarily, replication packets containing data set properties. In general, it is presently preferred that a data packet, whether for data set objects or data set properties, comprise:

| Sending Replica Node ID | Distribution List | Data Set ID | Change Set Available | Change Set Included | Data Field |
|---|---|---|---|---|---|

The sending replica node ID is an identifier that uniquely identifies the replica node that is sending the packet. Any type or form of ID will suffice for this purpose. For example, if the enterprise had synchronized clock values available, each ID could be drawn from the globally synchronized clock value or have the globally synchronized clock value as part of the ID. As another example, one of the replica nodes in the enterprise could be responsible for issuing ID values to all other replica nodes. Other methods could be developed and any method will work. All that is required is the ability to distinguish one replica node from another. The sending replica node ID may be a GUID value generated as previously described.

The distribution list is the list of replica nodes that should receive the replication packet. For data packets containing hierarchical information, such as data set properties, the distribution list typically includes all replica nodes in the enterprise. The data set ID is an identifier that uniquely identifies the data set of the transmitted data. Again any type or form of ID will work as long as the data set can be uniquely identified. In one preferred embodiment, the ID is a FUID value generated as previously described. As explained below, the data set ID can be used to identify the replication packet as one containing data set properties. In such a case the data set ID is a special ID reserved for data set property packets.

The change set available is the change set available on the sending replica node. It is included in the replication packet primarily for backfill purposes, as previously explained. The change set included is the set of changes that are included in the data field. This allows the receiving replica node to know what changes are contained in the received data. As described below, if the data field is successfully processed, the change set included is added to the local change set. Once the changes received in the data packet have been successfully processed, they become part of the local copy of the data set. The change set associated with the data set needs to be updated to reflect incorporation of the processed changes.

The data field is the actual data transferred. The data field can contain either changed data objects that should be incorporated into a local change set, or changed data set properties that need to be incorporated into the local data set list. For purposes of this invention, it is preferred that data fields containing changes to data set properties comprise:

| Deleted Data Set Count | Deleted Data Set Array | Create/Modify Data Set Count | DSI Array | Property Object Array |
|---|---|---|---|---|

Changes made to data set properties may include deletion of an existing data set, creation of a new data set, or modification of the properties of an existing data set. In the above, the deleted data set count is a count of how many data set deletes are included in this replication packet. The count is necessary because the deleted data set array which follows it will have one entry for each data set deleted and there may be any number data sets deletes in any given replication packet.

The deleted data set array is an array describing the data set deletes in the packet. Each entry in the data set array describes one data set that should be deleted. Each entry preferably comprises the data set ID of the data set being deleted and the change number assigned to the delete. The data set ID and change number can be a FUID, generated as previously described. Since the deleted data set count and the deleted data set array go together, the order should be maintained and the deleted data set array should follow the deleted data set count.

The create/modify data set count is the number of data set creates or modifies included in the replication packet. Again the count is necessary because the DSI array which follows will have one entry for each create or modify and any given replication packet may have any number of creates and/or modifies.

The DSI array (or Data Set Information array) is an array with each entry describing a create or modify of a particular data set. Each entry in the DSI array preferably comprises the data set ID of the data set being created or modified, the parent data set ID of the data set being created or modified, and an offset or pointer into the property object array where the properties of the data set can be found. The data set ID and parent data set ID are unique identifiers for the data set and its parent, respectively. The data set ID and parent data set ID may be a FUID generated as previously described. The offset or pointer into the property object array is needed because the length of the properties of a data set may be variable from data set to data set. It is easier to tell where one property object stops and another starts if they are stored in this manner. The size of each property object can be calculated by subtracting the offsets to successive entries in the DSI array (e.g. size of the $n^{th}$ property object=DSI offset of $n+1^{th}$ entry–DSI offset of $n^{th}$ entry). The size for the last property object can be calculated by subtracting the total size of the data property object array from the last DSI offset (e.g. size of last property object=Total property object array size–DSI offset of last entry).

The various property objects in the property object array that describe a data set can comprise the properties previously described, such as:

| Data Set Name | Data Set ID | Parent Data Set ID | Change Number | Time Last Modified | Predecessor Change List | Replica List | Pointer to Data Objects |
|---|---|---|---|---|---|---|---|

These properties have been defined and described previously.

Returning now to FIG. 3, as previously indicated, incoming packets are stored in replication packet list 36. In order to process the changes, a replication packet is selected for processing. Embodiments within the scope of this invention may comprise means for selecting a replication packet from the replication packet list for processing. In FIG. 3, such means comprises, for example, replication packet prioritization processing block 38. The details of replication packet prioritization processing block 38 are discussed further in FIG. 4 below. The purpose of replication packet prioritization processing block 38, however, is to select the next highest priority replication packet from replication packet list 36 and prepare it for processing. Although the details are discussed later, to prepare the packet for processing, replication packet prioritization processing block 38 will create an information object associated with the selected replication packet and enter it into a Replication Packet Information (RPI) list 40. The information objects in RPI list 40 are sometimes referred to as RPI structures and contain certain information that make processing the potentially large amount of information received in a replication packet easier.

As explained in greater detail below, information objects in RPI list 40 and the associated replication packet may remain in the system for a period of time before they are processed. In order to keep information from remaining too long on the system, embodiments with in the scope of this invention may comprise means for assigning a timeout value to the information objects in RPI list 40. As discussed hereafter, assigning a timeout value to the information objects in RPI list 40 has the effect of assigning a timeout value to the associated replication packet and, by extension to the changes in the replication packet. In FIG. 3, and as discussed in greater detail below, the means for assigning a timeout value may be implemented, for example, by replication packet prioritization processing block 38.

Since the intent of assigning timeout values is to set a limit on how long an information object and its associated replication packet will remain in the system, embodiments within the scope of this invention may comprise means for removing information objects and associated replication packets when their timeout values have been exceeded. By way of example, and not limitation, in FIG. 3 such means may comprise timeout processing block 42. Although the details of timeout processing block 42 are presented below, the purpose of timeout processing block 42 is to identify information objects in RPI list 40 whose timeout values have been exceeded and to remove such information objects along with their associated replication packets.

Embodiments within the scope of this invention can comprise means for processing changes by processing the entries in the information objects of RPI list 40. By way of example, such means can comprise received replication packet processing block 44 of FIG. 3. Received replication packet processing block 44 is responsible for processing all changes received in replication packets. To process the variety of changes received, including deletes, creates, and modifies, the means for processing changes may comprise means for processing changes relating to deletion of data sets, means for processing changes relating to creation data sets, and means for processing changes relating to modification of the properties of data sets. All these means may be implemented in replication packet processing block 44 as indicated in FIG. 3 by the plurality of processing blocks. The details of replication packet processing block 44 and how each of the various means may be implemented is described below.

In order to properly process hierarchical data, the means for processing changes, such as received replication packet processing block 44 of FIG. 3, may utilize a wide variety of lists or data stores. In FIG. 3 the lists or stores that are utilized to process hierarchical data include deleted data set array 45, DSI array 46, working set HDSI array 48, global HDSI tables 50, backfill set 52, local change set 54, tombstone set 56, data set list 58, and replica 60. The purpose, contents, and use of each of these lists or data stores will become apparent when various aspects of change processing are discussed in the appropriate sections below.

Embodiments within the scope of this invention can also comprise means for replicating, at predefined intervals, the changes that have been made locally to either data set objects or data set properties held on the replica node. Such means can be implemented, for example, by a store and forward process, as previously summarized above and discussed in greater detail in the copending Store and Forward Application, previously incorporated by reference.

Embodiments within the scope of this invention can also comprise means for recovering lost or missing changes. Such means can be implemented, for example, by a backfill process, as previously summarized above and discussed in greater detail in the copending Backfill Application, previously incorporated by reference.

In FIG. 3 the means for replicating the changes that have been made locally and the means for recovering lost or missing changes comprises transmit replication packet processing block 62. Transmit replication packet processing block 62 is designed to fill the transmit aspect of the data replication and/or data recovery functions. For example, transmit replication packet processing block 62 is responsible for transmitting the locally made changes, at appropriate intervals, to other replica nodes in the enterprise. Furthermore, transmit replication packet processing block 62 is also responsible for discovering changes missing locally by comparing received change sets to local change set 54. Transmit replication processing block 62 would then be responsible for recovering the missing data by transmitting backfill requests to other replica nodes. Finally transmit replication processing block 62 may also be responsible for transmitting any other required information such as status information or status information requests as described in the copending Backfill Application. In FIG. 3, the multiple types of processing is illustrated by the plurality of processing blocks in replication processing block 62 and the multiple types of transmit replication packets is illustrated by transmit replication packets 64.

The processing of incoming replication packets that fill backfill requests can be made part of received replication packet processing block 44. Any special processing that needs to be accomplished for these incoming replication packets can be made part of replication packet processing block 44. Details of the types of functions that can be included are found in the copending Backfill Application, previously incorporated by reference.

Figure 4:
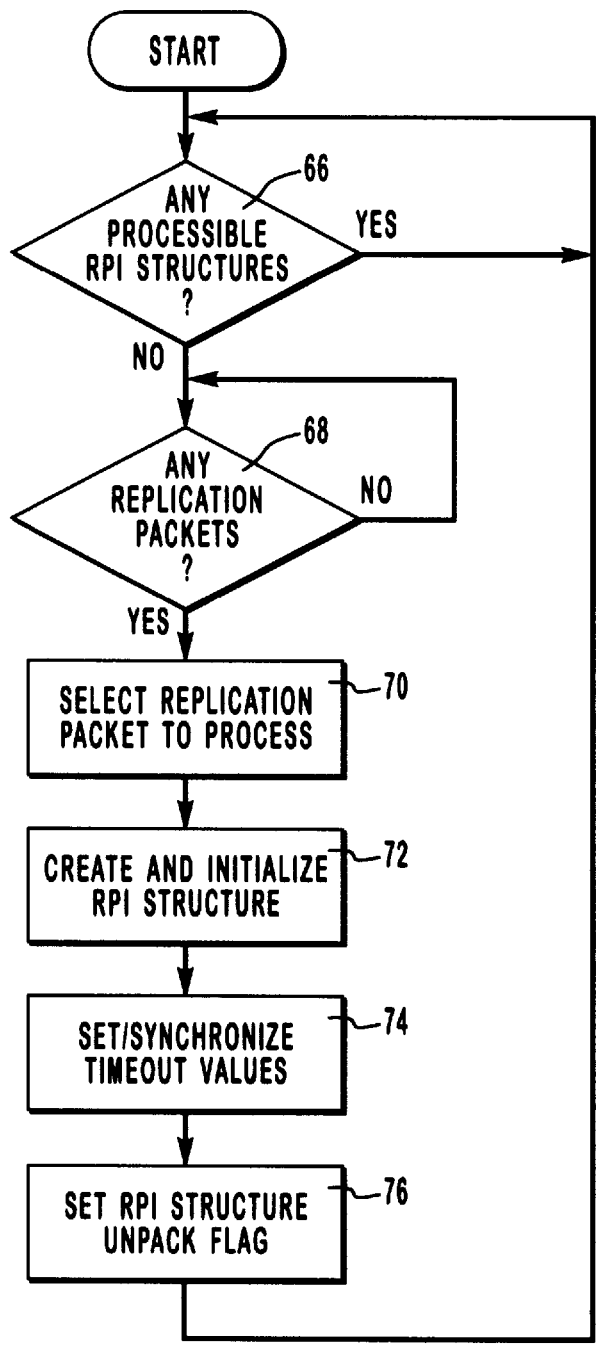
FIG. 4 is a flow diagram representing an example replication packet prioritization processing of the present invention.

Referring now to FIG. 4, the details of replication packet prioritization processing block 38 of FIG. 3 are discussed. As described previously, embodiments within the scope of this invention may comprise means for selecting a replication packet from the replication packet list for processing. Such means may be implemented, for example, by replication packet prioritization processing block 38 of FIG. 3. Replication packet prioritization processing block 38 of FIG. 3 selects a replication packet to process and prepares the appropriate structures for processing.

The first step of the selection process is to determine whether any processible RPI structures exist in memory. This is illustrated in FIG. 4 by decision block 66. One of the primary functions of replication packet prioritization processing block 38 is to ensure that processible entries exist in RPI list 40. Thus, when no more processible entries remain, replication packet prioritization processing block 38 creates another entry. If processible entries exist, replication packet prioritization processing block 38 waits until there are no processible entries in RPI list 40. This situation is illustrated in FIG. 4 by the "Y" branch of decision block 66.

If there are no processible entries in RPI list 40, the next step is to see if any replication packets exist for processing. This is illustrated in FIG. 4 by decision block 68. As indicated by the "N" branch of decision block 68, if there are no replication packets to process, processing is complete and replication packet prioritization processing block 38 waits until a replication packet has been received and can be processed.

If there are replication packets to process, the next step is to select one for processing. In selecting a packet for processing a decision must be made as to which replication packet should be processed. The present invention may, therefore, comprise means for prioritizing the replication packets so they are selected on the basis of a predetermined priority scheme. In FIG. 4 such means is illustrated by step 70. While such means is not required, implementing a means for prioritizing replication packets may result in increased efficiency by allowing the higher priority packets to be processed first.

Any scheme of prioritization designed to meet various data replication goals may be utilized. In a preferred embodiment of the present system several different types of replication packets are used. In one embodiment, in order of priority (highest to lowest) these replication packets are:

backfill requests: This type of packet contains a request from another replica node to supply missing changes. The replica node that sent the backfill request will only wait for a specified time before timing out the request and asking another replica node for the information. Since these packets must be processed within a certain period of time, they are assigned the highest priority.

data set list: This packet contains changes to the data set list (e.g. changes to data set properties) such as deleting data sets, creating data sets, and/or modifying the properties of data sets. Changes to the data set list should be processed before changes to the contents of the data sets. For example if a data set was created and then populated. If the system attempted to process the packet containing the data set objects before the packet containing the data set create, then processing would fail since there was no data set to hold the data objects. In such a case the data set must first be created by processing the packet containing the create and then process the packet containing the data set objects.

information requests: This packet contains a request for a replica node to respond with its change set for a given data set or group of data sets under certain conditions. Since some of these requests are needed to allow the replica node making the request to perform some type of processing, this type of request is assigned the third highest priority.

data set contents: This type of replication packet contains changes to the data set objects contained in a data set.

information: This packet contains information about the changes available at another replica node in the enterprise. Since these packets are only used during the discovery phase of backfill (the phase where the local replica node discovers that data is missing locally), they are given the lowest priority.

Although data set list packets and data set contents packets are both data packets, they are treated separately here to emphasize that replication packets containing data set properties should be processed before replication packets containing data set objects. Information about the details of the above packet types can be found in the copending Store and Forward Application and the copending Backfill Application, both previously incorporated by reference.

Due to the potentially large amount of information in a replication packet, to make processing easier it may be desirable to keep some of the information of the replication packet in memory. Embodiments within the scope of this invention can, therefore, comprise means for creating at least one information object associated with each received replication packet. By way of example, and not limitation, such means may comprise step 72 of FIG. 4. Step 72 of FIG. 4 indicates that after the replication packet has been selected, an appropriate information structure is created. The information structure, sometimes called an RPI structure, is an entry in the RPI list. In one preferred embodiment, the entries in the RPI list comprise:

Timeout value is a time at which the replication packet associated with this RPI structure will be assumed to be unprocessible. RPI structures and their associated replication packets are removed when the timeout value is exceeded.

The data set identifier is an identifier that uniquely identifies the data set. This value is the data set identifier from the replication packet.

The DSI array (Data Set Information array) only applies to replication packets containing data set properties (data list packets). This array, which is discussed in greater detail below and which is represented in FIG. 3 by DSI array 46, has been discussed previously in conjunction with the contents of replication packets containing data set properties. This array contains one entry for each create or modify in the packet. Each entry of the DSI array comprises the data set ID, the parent ID, and the property object offset value. As discussed below, the DSI array may be kept with the RPI list entry or may be stored separately with a pointer to the DSI array stored in the RPI list entry.

The total count of DSI entries and the unprocessed DSI entries only apply to data list packets and identify the number of entries in the DSI array and the number of entries in the DSI array that have not yet been processed, respectively. The use of these two counters is more fully described below.

Embodiments within the scope of this invention can have timeout values on a variety of items. For example, it has been indicated that backfill entries, such as those in backfill set 52, also have a timeout value. While further details of the timeout values used in conjunction with backfill entries can be found in the copending Backfill Application, essentially once missing changes have been identified and a backfill request sent to one or more replica nodes, a timeout value is set. If a response is not received within the timeout value, another request is sent to one or more other replica nodes, if possible, or the backfill entry is removed from the backfill set if no other replica node can fill the backfill request. Because changes received in replication packets do not become part of the local change set until they have been processed, it would be unfortunate if a backfill entry timed

| Replication Packet ID | Replication Packet Type | Flags | Timeout Value | Data Set ID | DSI Array | Total DSI Entries | Count of Unprocessed DSI Entries |
|---|---|---|---|---|---|---|---|

The replication packet ID is a value which uniquely identifies the replication packet record in the replication packet list. In other words, it is a pointer or index that allows the replication packet associated with this RPI structure to be identified in the replication packet list, such as replication packet list 36 of FIG. 3. In one embodiment the replication packet ID is a FUID, which is used as a key value for an indexed lookup in a database table.

The replication packet type is one of the replication packet types listed above (backfill request, information request, data set list, data set contents, information).

Each RPI list entry can have a number of flag bits associated with it. These flag bits are used during processing to synchronize operations between various processes or processing threads. In one preferred embodiment, the flag bits comprise: InUse, Unpack, Delete, and Error. These flags will be discussed in greater detail below. When the RPI structure is first created, the Unpack bit is set to indicate that the replication packet associated with the RPI structure should be processed at this time.

out while changes that could fill the backfill request were waiting to be processed.

In order to prevent backfill entries from timing out while information that fills the backfill requests is waiting to be processed, embodiments of this invention may comprise means for synchronizing the timeout values of a backfill entry and the timeout values of received changes that can fill at least a portion of the backfill entry.

As described above, RPI entries and associated replication packets may also have timeout values. As described more fully below, when hierarchically related data (data that is related in a hierarchical fashion in that one data object either depends on another or is in the hierarchy tree of the other) is processed, it must be processed in a certain order. Thus, some data may sit at the replica node for a while awaiting processing in the proper order. Because different replication packets may contain different changes to the same hierarchy, it would be unfortunate if changes to one portion of the hierarchy timed out while another portion was being processed.

In order to prevent portions of the hierarchy tree from timing out, preferred embodiments of this invention may comprise means for synchronizing the timeout values of hierarchically related changes so that the various replication packets containing such hierarchically related changes will have the same timeout value. Such means can be implemented by means for synchronizing the timeout values among information objects that contain hierarchically related entries so that all information objects having hierarchically related changes will have the same timeout value.

Any or all of the means for synchronizing various timeout values described above may comprise, for example, step 74 of FIG. 4. The "synchronize timeout values" language of this step illustrates that for embodiments that synchronize timeout values, when the RPI structure is created and initialized, the appropriate timeout values should be synchronized. In order to synchronize the timeout values of various hierarchically related changes, for example, as the RPI structure is created, the hierarchical structure can be traced and the timeout values updated to the same value as the latest RPI list entry. Using the example of the sports folder tree above:

```
All folders
 | Sports
    | Baseball
       | Seattle Mariners
          | Ken Griffey Jr.
          | Jay Buhner
       | Chicago White Sox
       | New York Yankees
    | Basketball
       | Chicago Bulls
       | Seattle Sonics
```

If a change is received that moves the Jay Buhner folder from the Seattle Mariner's folder to the Chicago White Sox folder, then the hierarchy from the Chicago White Sox up to the root (e.g., "All folders")could be traced and the timeout value of any RPI list entries dealing with the folders Chicago White Sox, Baseball, Sports, or All folders could be updated to the timeout value of the entry dealing with the Jay Buhner folder. If an entry were to deal with a folder in the middle of the hierarchy, then the hierarchy could be traced both up and down to identify any hierarchically related changes that should have their timeout values synchronized. In this way, none of the changes relating to the hierarchy will expire until they all expire.

To synchronize the timeout values of received changes and backfill set entries, the change set included parameter of the received replication packet is compared to the change ranges of the various backfill set entries. If the change range included in the replication packet will fill or partially fill one of the entries, then the timeout values of the backfill entries are updated to be the same as the timeout value of the replication packet (which is the timeout value of the associated RPI list entry). Furthermore, all backfill entries that are related to the entry that can be filled are also updated. As explained in the copending Backfill Application, more than one backfill request can be sent in a backfill request packet. Thus, there may be more than one backfill entry waiting to be filled from the same backfill request. The request may be filled using multiple replication packets so the other entries related to the backfill request should not time out until all entries relating to the same backfill request timeout. Further details about tracking and updating related backfill entries can be found in the copending Backfill Application, previously incorporated by reference.

Synchronizing timeout values can create problems in certain circumstances. For example, when hierarchy is large and many packets are received that cannot be processed, nothing will ever timeout. It may, therefore, be desirable in certain circumstances to not synchronize timeout values either among backfill entries and received changes or among hierarchically related changes. Embodiments that do not synchronize timout values between backfill entries and received changes do not need means for synchronizing the timout values of a backfill entry and the timout values of received changes that can fill at least a portion of the backfill entry. Embodiments that do not synchronize timout values between values of hierarchically related changes. Step 74 of FIG. 4 illustrates embodiments that do not synchronize timeout values by the "set . . . timeout values" language.

For embodiments that do not synchronize timout values, it may be desirable to set the timeout value at a relatively long period of time. This time should be longer than any expected delays. Because the timout value is used for received replication packets filling backfill requests, any expected processing delays in having the complete request filled by another replica node should also be included. In one embodiment the timeout is set to seven (7) days.

If timeout values are not synchronized between backfill entries and received changes, modifications to the backfill logic may also be made. For example, it may be desirable to reset the timeout value for all backfill entries that are associated with a received replication packet. By resetting the timeout value whenever part of the request is received, the system will wait as long for the last replication packet as for the first replication packet.

After the appropriate timeout values are synchronized (for embodiments employing synchronization) or set (for embodiments without synchronization), the next step is to indicate that the replication packet and its associated RPI structure are ready for processing. This is illustrated in FIG. 4 by step 76 which sets the Unpack flag. The Unpack flag is a signal to received replication packet processing block 44 of FIG. 3 that the RPI structure should now be processed.

Figure 5:
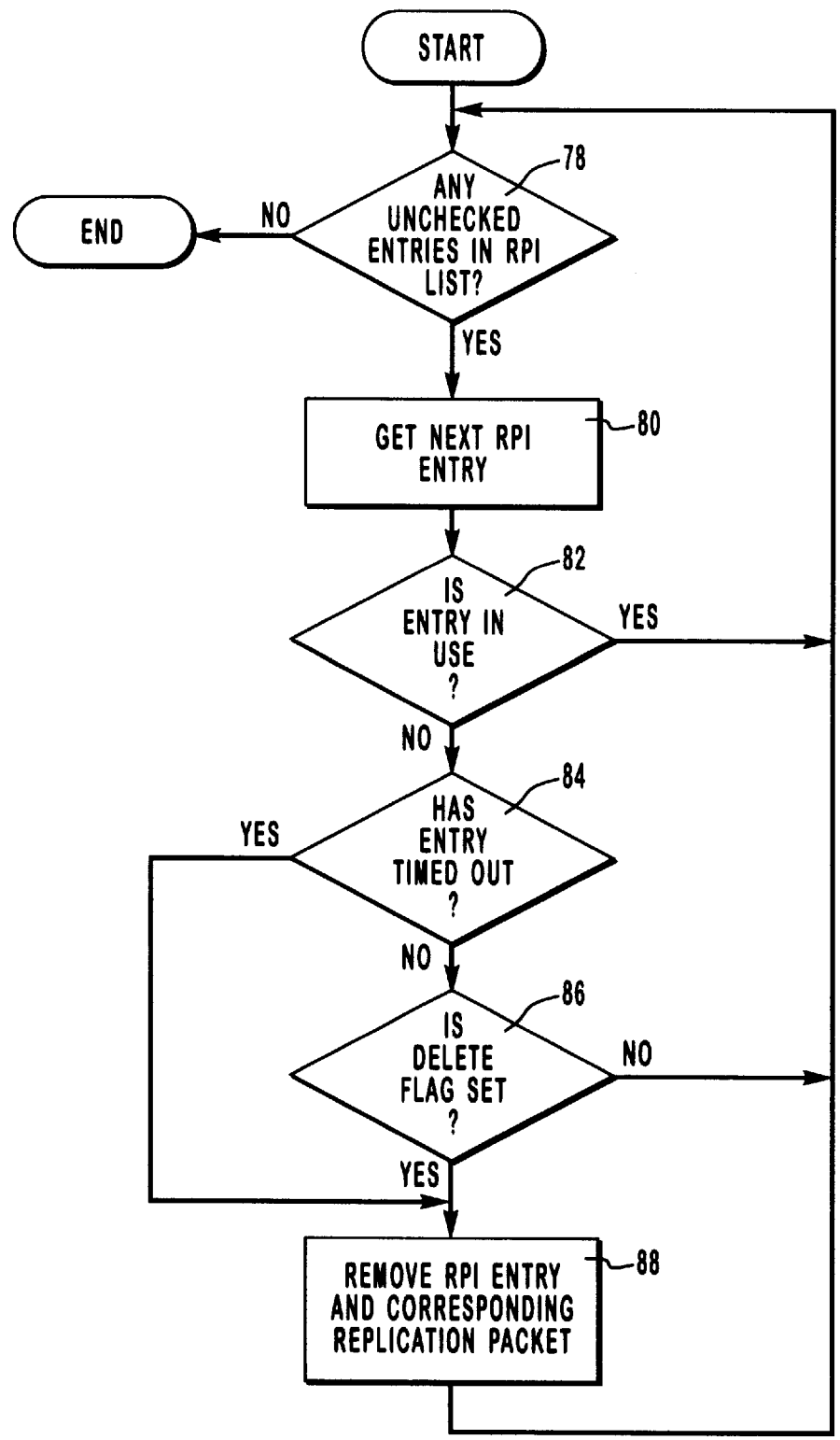
FIG. 5 is a flow diagram representing timeout processing of the present invention.

Referring next to FIG. 5, the details of timeout processing block 42 of FIG. 3 are presented. Timeout processing block 42 periodically checks RPI list 40 for entries that have timed out and should be removed. Each entry in the RPI list should be checked. This is indicated in FIG. 5 by decision block 78. If all the entries have been checked, the process terminates until the next time it runs. Otherwise the process retrieves the next entry to check. This is illustrated in FIG. 5 by step 80.

As described in greater detail below, processing each RPI list entry can require the processing of several changes. Thus, it would be undesirable to have the RPI list entry timeout while it was being processed. To avoid such a possibility, embodiments within the scope of this invention may comprise means for preventing the timeout and removal of an information object, such as an RPI list entry, when entries of the information object are being processed. By way of example, and not limitation, such means can comprise decision block 82 of FIG. 5. As illustrated therein, decision block 82 checks to see if the RPI list entry is in use. This may be determined, for example, by checking the InUse flag of the RPI list entry. As explained below, the InUse flag is set whenever the RPI list entry is being processed. Other mechanisms may also be used as long as timeout processing block 42 of FIG. 3 can determine when an RPI list entry is being processed.

As previously described, it would be undesirable to have part of a group of hierarchically related changes timeout and part of a group of hierarchically related changes remain. Part of this issue may be addressed by including means for synchronizing the timeout values of hierarchically related changes. Some embodiments, however, do not use timeout synchronization and even for those that do, a situation could still exist where the timeout value of one part of the hierarchically related changes is exceeded while another part of the hierarchically related changes are being processed. The InUse flag set on the RPI list entry relating to some of the changes will prevent the changes that are being processed from being removed. In order to prevent any other hierarchically related changes from timing out under these conditions, embodiments may comprise means for preventing the timeout and removal of information objects that are hierarchically related to information objects with entries that are being processed. Such means may comprise, for example, step 82 of FIG. 5 where step 82 checks to see if any hierarchically related entries are being processed by traversing the hierarchy looking for related entries that have the InUse flag set or have other indications that they are being processed. This is analogous to expanding the definition of "in use" to include the case that where one RPI list entry is in use, any other hierarchically related RPI list entry is also in use.

If the entry is not in use, or if no hierarchically related entry is in use, then the next step is to check if the entry has timed out. This is illustrated in FIG. 5 by decision block 84. As indicated by the "Y" branch of decision block 84 and by step 88, if the entry has timed out, then the RPI list entry and the associated replication packet are removed. It is important that the RPI list entry and the replication packet are removed as an atomic operation so that either both are removed or neither is removed.

If the entry has not timed out, then the next step is to check if the delete flag is set. This is illustrated in FIG. 5 by decision block 86. Embodiments of the present invention can comprise means to remove any information object whose entries have been fully processed. Such means can be implemented, for example, by setting the Delete flag and having timeout processing block 42 of FIG. 3 remove any RPI entries with the Delete flag set. Such an implementation is illustrated in FIG. 5 by decision block 86. Other mechanisms may be used to implement such means to remove information objects whose entries have been fuilly processed. For example, received replication packet processing block 44 may simply delete RPI entries as they are processed. Other mechanisms may exist as well.

If the delete flag is not set, then the RPI list entry is not ready to be deleted. The "N" branch of decision block 86 illustrates that in such a case the RPI entry is retained. Otherwise the RPI entry (and corresponding replication packet) is removed as illustrated by step 88.

Figure 6:
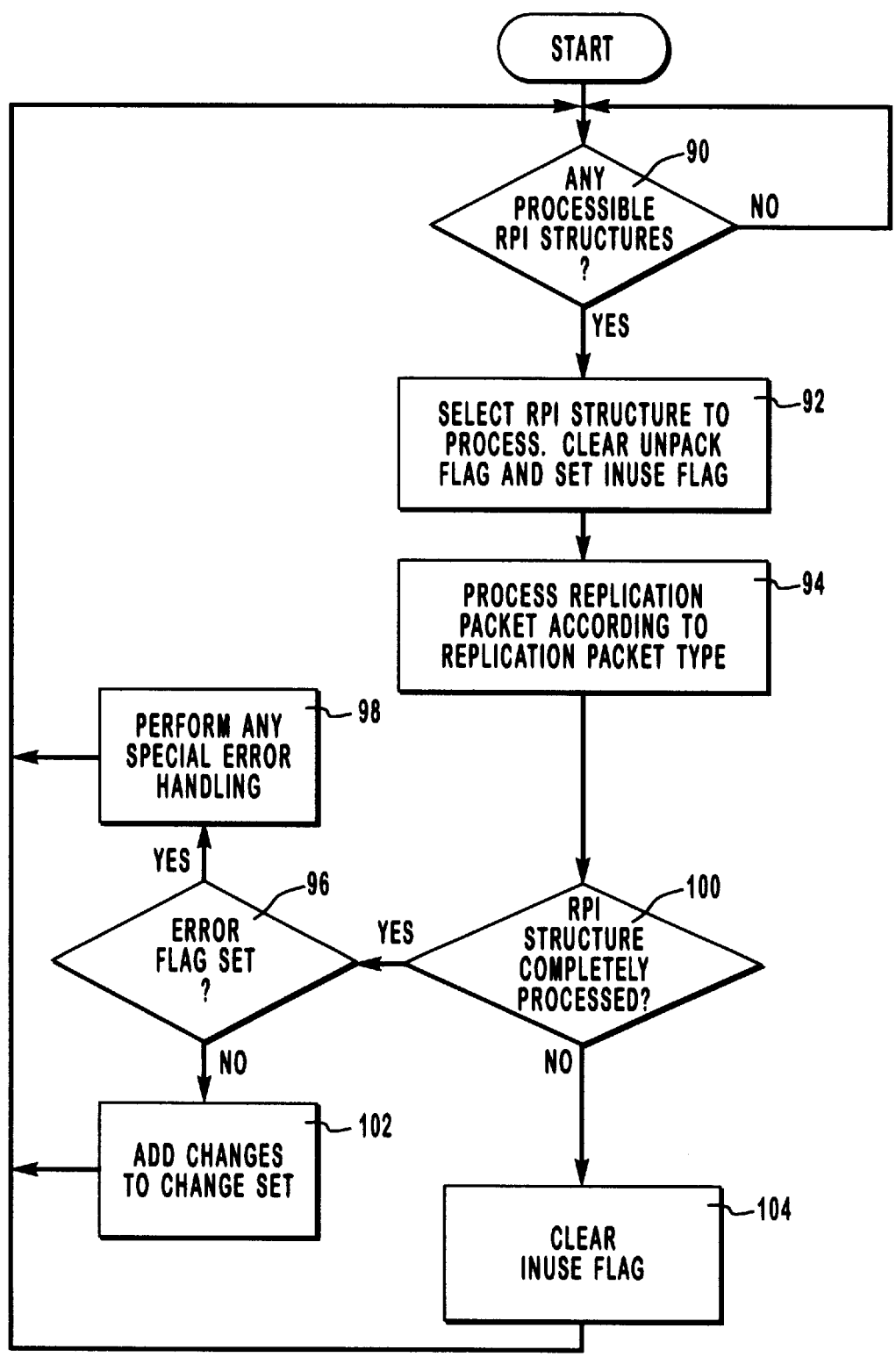
FIG. 6 is a flow diagram representing an example overview of the replication processing of one embodiment of the present invention.

Referring next to FIG. 6, an overview of the processing of RPI structures is presented. The overview in FIG. 6 describes the basic processing that occurs in received replication packet processing block 44 of FIG. 3. In FIG. 6, the process starts by ascertaining if there are any processible RPI structures in RPI list 40. This is illustrated in FIG. 6 by decision block 90. If not, then the process waits until a processible RPI structure is available, as illustrated by the "N" branch of decision block 90. A processible RPI structure can be indicated, for example, by an RPI entry with the Unpack flag set. In one preferred embodiment of the present invention, whenever an RPI structure is ready for processing the Unpack flag is set. An instance of this has already been explained previously in conjunction with step 76 of FIG. 4.

If one or more processible RPI structures exist, the next step is to select one for processing. Embodiments within the scope of the present invention may, therefore, comprise means for selecting an information object to process. By way of example, and not limitation, such means may comprise step 92 of FIG. 6. Any method of selecting an RPI structure for processing will suffice. Some methods, however, may be more beneficial than others. For example, in one preferred embodiment, the RPI structure closest to timing out will be selected. In another preferred embodiment both the timeout value and priority (based on replication packet type) are used. In this scheme, all entries of a higher priority will be processed (by timeout value) before entries of the next highest priority. This gives the highest priority RPI structures close to timeout the most likely chance of being processed before they are deleted.

As illustrated in FIG. 6, step 92 also clears the Unpack flag and sets the InUse flag. This lets other processes know that the RPI list entry is being processed. Setting the InUse flag will, for example, prevent the RPI list entry (and, in one preferred embodiment, any hierarchically related RPI list entry) from timing out.

The next step is to process the replication packet according to the replication packet type. This is illustrated in FIG. 6 by step 94. The exact type of processing that occurs depends on the type of replication packet. For example, the processing of replication packets containing hierarchically structured data is described below in FIGS. 7–10. Processing for other types of packets is described in the following copending applications: copending Store and Forward Application, previously incorporated herein by reference, describes the basic processing of data packets containing data objects of a data set; copending Backfill Application, previously incorporated herein by reference, describes the basic processing for backfill request packets, information packets and information request packets; copending Conflict Resolution Application, previously incorporated by reference, describes how conflicts are detected and resolved for replication packets containing data objects or data set properties; copending Replica Administration Application, previously incorporated by reference, describes the processing necessary to safely remove copies of data sets from a replica node or move a copy of a data set from one replica node to another; and copending U.S. patent application Ser. No. 08/679,053, entitled "Time Based Expiration of Data Objects in a Store and Forward Replication Enterprise," incorporated herein by reference, describes the processing necessary to implement various types of time based data expiration in a replication environment.

After step 94, decision block 100 tests whether the RPI structure was completely successfully processed If the RPI structure was completely processed, then decision block 96 checks to see if the Error flag is set. As described in greater detail below, the Error flag is set whenever an error occurs during processing If the Error flag is set, then step 98 indicates that any special error handling is performed at this point. If the Error flag is not set, and if the RPI structure was associated with a data packet (either containing data objects or data set properties), then the changes that have been processed should be added to local change set. This is illustrated in FIG. 6 by step 102. This step highlights the fact that embodiments within the scope of the present invention can comprise means for storing a change set comprising changes that have been successfully processed. Such means may comprise, for example, local change set 54 of FIG. 3. Such means may also comprise, for example, step 102 of FIG. 6.

If the RPI structure was not fully processed, execution proceeds to step 104. Such a situation may occur, for example, if the replication packet has changes involving hierarchically structured data and one or more of these changes cannot be processed due to a hierarchical dependence on an unprocessed change. In such a situation, it would be undesirable to throw away the replication packet. It is much better to keep the replication packet for a while to see if the change on which it depends will be received and processed soon. Thus, embodiments of this invention may comprise means for deferring processing of changes that cannot be processed due to a hierarchical dependence on unprocessed changes. Embodiments within the scope of this invention may also comprise means for retaining such unprocessed changes until a future time when they may possibly be processed.

These means may be implemented by means for deferring processing one or more entries of an information object, such as an RPI structure. By way of example, and not limitation, in FIG. 6 such means is illustrated by step 104 which clears the InUse flag and returns to retrieve another RPI list entry. At this point in the decision tree, clearing the InUse flag may clear all flags. As explained in greater detail below, by clearing the InUse flag and leaving the RPI structure in the RPI list, the information is available for further processing at a future time.

Figure 7:
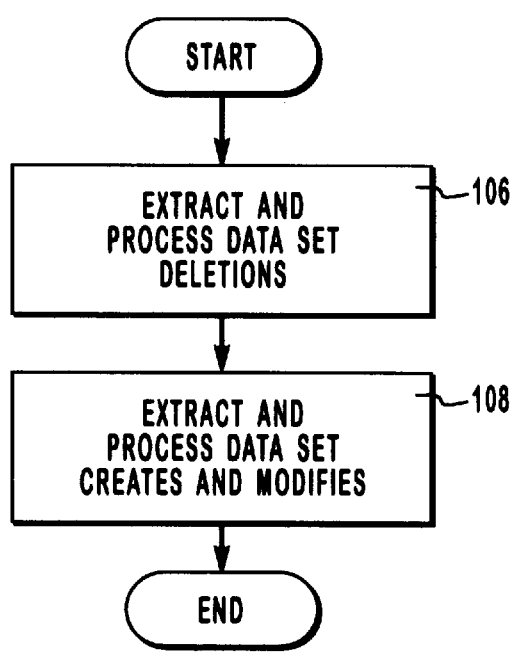
FIG. 7 is a flow diagram representing an example overview of processing hierarchically structured data.

Referring now to FIG. 7, an overview of the specific processing of one preferred embodiment that takes place for hierarchically structured data, such as replication packets containing data set properties, is presented. The broad overview illustrated shows that there are two steps to processing hierarchically structured data. The first step, illustrated by step 106, is to extract and process the changes that delete data sets. The second step, illustrated by step 108, is to process the changes that create a new data set or that modify the properties of existing data sets. As discussed previously, the means for processing changes of the present invention may comprise means for processing changes relating to deletion of data sets, means for processing changes relating to creation data sets, and means for processing changes relating to modification of the properties of data sets. By way of example, and not limitation, the means for processing changes relating to deletion of data sets may comprise step 106 of FIG. 7. Also by way of example, the means for processing changes relating to creation of data sets and means for processing changes relating to modification of the properties of data sets may comprise step 108 of FIG. 7.

The ordering of steps 106 and 108 provides an efficiency improvement. If a data set is deleted, any changes that have occurred before the delete but that have not yet been processed do not have to be processed. It is inefficient to make changes to a data set only to delete the data set shortly thereafter.

Figure 8:
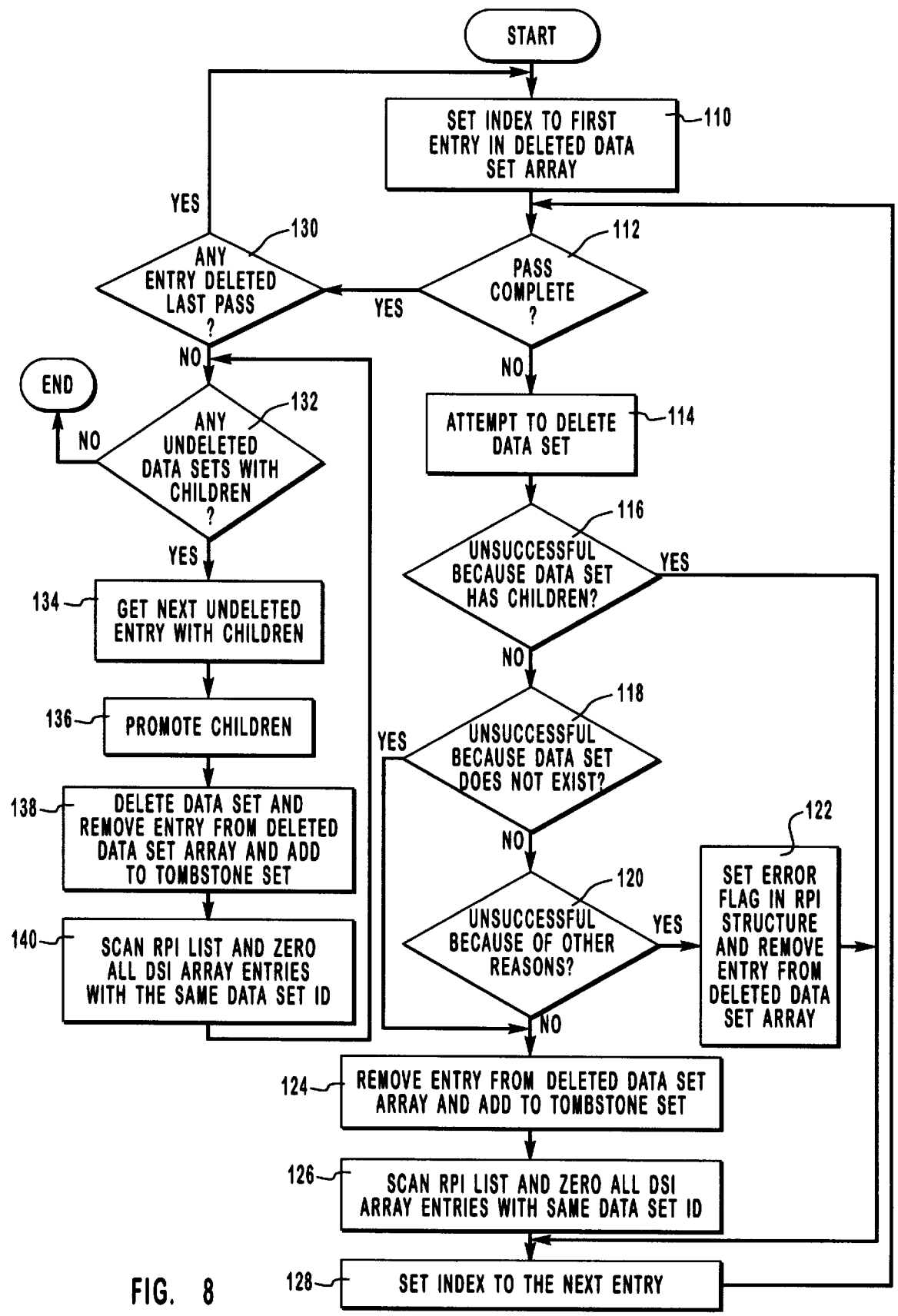
FIG. 8 is a flow diagram illustrating example processing of deletes of hierarchically structured data in one embodiment of the present invention.

The details of the implementation of step 106 of FIG. 7 in one presently preferred embodiment is presented in FIG. 8. The means for processing changes relating to deletion of data sets previously discussed can be implemented using means for processing the entries in an information object, such as an RPI object in RPI list 40, that relate to deletion of data sets. As will be understood from the discussion and examples below, the means for processing changes relating to deletion of data sets must be able to handle the situation where the data set being deleted has no undeleted child data sets and the situation where the data set being deleted has undeleted child data sets. Thus, embodiments within the scope of this invention may comprise means for deleting parent data sets without undeleted child data sets. Embodiments within the scope of this invention may also comprise means for deleting parent data sets with at least one undeleted child data set. FIG. 8 illustrates one example of implementing the above means through processing the entries of an RPI structure deleting data sets.

Before covering the details of FIG. 8, it may be useful to restate one of the goals of the replication of hierarchically structured data. When replicating hierarchically structured data among various replica nodes, the goal is that eventually all replica nodes must possess the same data hierarchy. Specifically, the system will require that where two copies of the same data set have the same change set, they must be identical independent of the order in which the changes are received.

In discussing deletion of hierarchically structured data, a few concepts are important. In a preferred embodiment of the present invention, if a parent data set and any associated child data sets are to be deleted, the replication engine will replicate out one delete for each of the data sets deleted (e.g., one delete for the parent and one delete for each of the children). Although it might seem sufficient to replicate a single delete for the parent data set and let this delete remove all child data sets, such an approach can lead to lost data. Consider the following example. Suppose the same folder hierarchy existed on two different replica nodes:

```
Root
 └─ F1
```

Now suppose that on replica node 2 a user deleted folder F1 (assigned change number RN2-1) and on replica node 1 a user added a child folder, F2 (assigned change number RN1-1). Now the folder hierarchy on each replica node is:

| Replica Node 1 | Replica Node 2 |
|---|---|
| Root<br>  | F1<br>  | F2 | Root |

The create of folder F2 will be replicated to replica node 2 and the delete of F1 will be replicated to replica node 1. The create of folder F2 on replica node 2 will fail because F1 does not exist. Eventually the replication packet will time out and be removed. The change set for replica node 2 will not include change RN1-1 but would include RN2-1. Replica node 1 will delete folder F1. The change set of replica node 1 will include both change RN2-1 and change RN1-1. If the delete also deleted folder F2, then folder F2 would be lost without a user taking action to delete the folder (the user on replica node 2 could not have intended to delete folder F2 since F2 was unknown at replica node 2). The state of the replication enterprise would be that replica node 2 would have a change set with change RN2-1 and replica node 1 would have a change set with change RN1-l and RN2-1. Furthermore, folder F2 has been lost. There would be no way for replica node 2 to recover the changes and bring its change set up to date. As explained in greater detail below, such a situation can be avoided by requiring replication of every delete when a parent data set and any child data sets are deleted. Thus, in order to cleanly delete a parent data set, the parent data set must have no undeleted child data sets.

The process of FIG. 8 can be summarized as follows. To process deletes, the present invention extracts the information in the deleted data set array of the replication packet associated with an RPI structure. In order to process this information, the deleted data set array may be copied into memory or may be part of the RPI structure itself (such a deleted data set array is illustrated in FIG. 3 as deleted data set array 45). The invention then repeatedly scans the deleted data set array, processing changes that delete data sets that have no undeleted child data sets. As long as a data set is deleted on a given pass, one more pass is made through the deleted data set array to see if the deletion of that data set has enabled the deletion of another data set.

Once all data sets that have no undeleted child data sets have been processed, what remains are data sets that should be deleted but have undeleted child data sets that are preventing the delete from occurring. In order to enable the delete, any undeleted child data sets are promoted to the level of the parent and the parent data set is deleted. While this creates a change in the hierarchy, such a change is necessary to avoid data loss. The present invention is structured so that all servers will create the exact same change in the hierarchy so that the hierarchy stays synchronized across the enterprise, with each server having an identical copy of the hierarchy.

Returning to example given above, when replica node 1 attempts to delete folder F1 the attempt will fail. This is because folder F1 has an undeleted child folder, F2. According to the process just described, folder F2 would be promoted and F1 deleted. Now on replica node 1 the folder hierarchy is:

On replica node 2 the sequence of events is much the same as before with one important difference. When the create of folder F2 is received, the create will fail and eventually time out as before. This will eventually result in a backfill request to replica node 1 for the change containing the create of folder F2. When replica node 1 responds this time, however, folder F2 has a new parent (root) but the same change number (RN1-1). Because of the new parent, the create on replica node 2 will succeed. Thus the goals of the replication engine have been achieved. Both replica nodes have the exact same folder hierarchy with the exact same change set. The parent of folder F2 was changed by the replication engine, which may not be what a user expects, but it prevents the loss of folder F2 altogether.

Referring now to FIG. 8, the first step (after extraction of the deleted data set array) is to set the index to the first entry in the deleted data set array. This is illustrated in Figure 8 by step 110. As will be seen later, this step is useful in repeatedly passing through the list, processing all deletes that can be processed.

The next step in FIG. 8 is to test whether the pass is complete. This is illustrated by decision block 112. What happens when a pass is complete will be discussed below. If the pass is not complete, then the system is still looking through the deleted data set array, deleting parent data sets that have no undeleted children. This is represented by the "N" branch of decision block 112.

If the system is still looking through the deleted data set array, deleting parent data sets that have no children, the next step is to attempt to delete the data set. This is illustrated in FIG. 8 by step 114. The outcome of this attempt is then examined to decide what action should be taken. If the attempt was unsuccessful because the data set has undeleted children, then processing of the delete will be postponed. This is illustrated by the "Y" branch of decision block 116 that leads to step 128 which sets the index to the next entry in the deleted data set array.

If the data set had no undeleted children, then the next condition tested is whether the delete was unsuccessful because the data set does not exist. This is represented in FIG. 8 by decision block 118. Because of various factors such as replication delays, routing delays and the timing of actions by a user relative to a replication broadcast, it is possible to receive the delete of a data set before the create of a data set or to receive the delete of a data set in the same replication packet as the create of the data set. If a data set is deleted on two or more servers, then multiple deletes for the same data set will be received. In such a situation, it is better to treat the data set as if it had already been created. Treating the data set as if it had already been created allows bypassing the processing of changes relating to the create (or modification) of the data set. The "Y" branch of decision block 118 thus continues processing at the same point as a successful delete (step 124). It is acceptable to process the delete of a data set that has not been created because deletes override creates. In other words, the create will be ignored if there is an entry in the tombstone set for the data set being created.

As illustrated by steps 124, 126, and 128, when a delete is successful, the entry is removed from the deleted data set array and added to the tombstone set. The tombstone set, as for example tombstone set 56 of FIG. 3, is a place to track all data sets that have been deleted. By tracking the data sets that have been deleted, processing changes associated with already deleted data sets can be avoided. The data that is added to the tombstone set is the data set ID and the change number of the change that deleted the data set.

After the data set ID and change number have been added to the tombstone set, the next step, represented by step 126, is to scan the RPI list and remove any entries dealing with creates or modifies with the same data set ID. Because the data set was deleted, there is no reason to process any create or modify associated with the same data set. This may be accomplished by zeroing any entries in the DSI array of an appropriate RPI structure and decrementing the number of unprocessed DSI entries. The use of zeroing DSI array entries and decrementing the number of unprocessed entries to indicate completed processing of any entry is discussed in greater detail below. Finally, step 128 sets the index to the next entry.

Returning to decision block 118, if the data set existed (the delete was not unsuccessful because the data set did not exist), the next test is to see if some unexpected error occurred. This test is performed in decision block 120. If an unexpected error occurred, then the Error flag is set on the RPI structure and the entry is removed from the deleted data set array. This is illustrated by step 122. Processing then continues at step 128 which increments the index to the next entry in the deleted data set array.

If step 124 is reached, the entry is treated as a successful delete. Note that passing through step 124 constitutes a deletion on this pass and so will force another pass through the deleted data set array. Processing of successful deletes has been previously described above.

While the processing loop just described started with step 114, which attempted to delete the data set and then tested the result through a series of decision blocks, the sequence of events could just as easily have been reordered to perform the tests of decision blocks 116 and 118 prior to attempting the delete. For these tests, all the information exists to test the condition before the attempt is made.

The above statement illustrates what is meant when the phrase "attempt to . . . " is used. In the context of this invention, the phrase "attempt to . . . " can imply either actually making the attempt and seeing what the result is or, equivalently, checking to see if a particular action can be accomplished and then accomplishing it if possible or determining why the action could not be accomplished.

Returning now to decision block 112, if the pass through the deleted data set array is complete, then execution continues at decision block 130. Decision block 130 tests whether an entry was deleted on the last pass. Recall that passing through step 124 constitutes a delete. If a data set was successfully deleted last pass, execution continues back at step 110, which sets up for another pass through the deleted data set array.

The repeated processing of the deleted data set array as just described is but one example of an implementation of means for deleting a parent data set without undeleted child data sets. Any method which achieves the same results, even though the sequence of steps above are reordered, or some of the steps are left out, can also be used. For example, although it is preferred to track unexpected errors (decision block 120 and step 122) for robustness of the method, such a step is not strictly required. The core fimctionality that is required is to delete all possible data sets without undeleted child data sets. This usually requires making multiple passes through the list of changes deleting data sets in order to determine if a data set just deleted has enabled the delete of yet another data set. As another example, it may be possible to trace the hierarchy and identify those data sets that can be deleted and the proper order in which to process the deletes. This may allow a single pass through the list of changes, at least for those changes that have already been received.

Returning now to FIG. 8, if no data set was deleted last pass, then that means that all data sets with no undeleted child data sets have been deleted. If any changes deleting data sets remain, these changes are attempting to delete data sets with undeleted child data sets. Execution proceeds first to decision block 132 in order to determine if any changes attempting to delete data sets with undeleted child data sets are left to process. If not, then the process ends. If there are changes attempting to delete data sets with undeleted child data sets, execution proceeds with step 134.

Step 134 identifies the next data set having undeleted child data sets. Step 136 then promotes all undeleted child data sets to the level of the parent data set. This is accomplished by simply changing the parent property of the child data set to match the parent property of the parent data set. Note that this change is made without assigning a new change number to the data set being promoted. The reason why this change can be made without assigning a new change number is that all replica nodes that attempt to delete the same parent data set are guaranteed to resolve the issue in exactly the same way by promoting the child data sets. Thus, if replica node A and replica node B have the same hierarchy and change set, then both receive the change to delete a particular data set, they will execute the exact same process and perform the exact same steps and achieve the exact same results. Furthermore, the process has been designed so that it does not matter in what order the changes arrive. All replica nodes that have the same change set will have the same hierarchy.

After the undeleted child data sets have been promoted, no more undeleted child data sets remain. The data set can then be deleted and the change number and data set ID added to the tombstone set. This is illustrated in FIG. 8 by step 138.

The after the data set has been deleted and the data set ID and change number added to the tombstone set, the next step is to scan the RPI list and remove entries dealing with creates or modifies with the same data set ID. This is illustrated in FIG. 8 by step 140. As previously described in conjunction with step 126, if a data set is deleted, there is no reason to process any changes relating to creates or modifies of the data set. As before, this may be accomplished by zeroing any relevant DSI array entries and decrementing the number of unprocessed DSI array entries. Note that if the data set is recreated, it would be assigned a different data set ID and so any RPI list entries recreating the data set just deleted would have a different data set ID and would not be affected either by this step or by step 126.

After step 140, execution then continues at decision block 132 in the same fashion until all changes deleting data sets with undeleted child data sets have been processed. The processing loop just described (steps 134, 136, and 138) are an example of the means for deleting a parent data set with at least one undeleted child data set, the core functionality of which is to promote the child data sets to the level of the parent data set and then delete the parent data set.

Returning for a moment to FIG. 7, after the data set deletions are processed, step 108 indicates that the next step is to extract and process the changes relating to the creates or modifies of data sets. Details of one embodiment implementing this step are given in FIGS. 9 and 10. Before examining FIGS. 9 and 10, however, one point should be made. When processing hierarchically structured data it is necessary to process the creates from the top down. In other words, a child data set cannot be created before its parent exists or an orphan situation candevelop.

Figure 9:
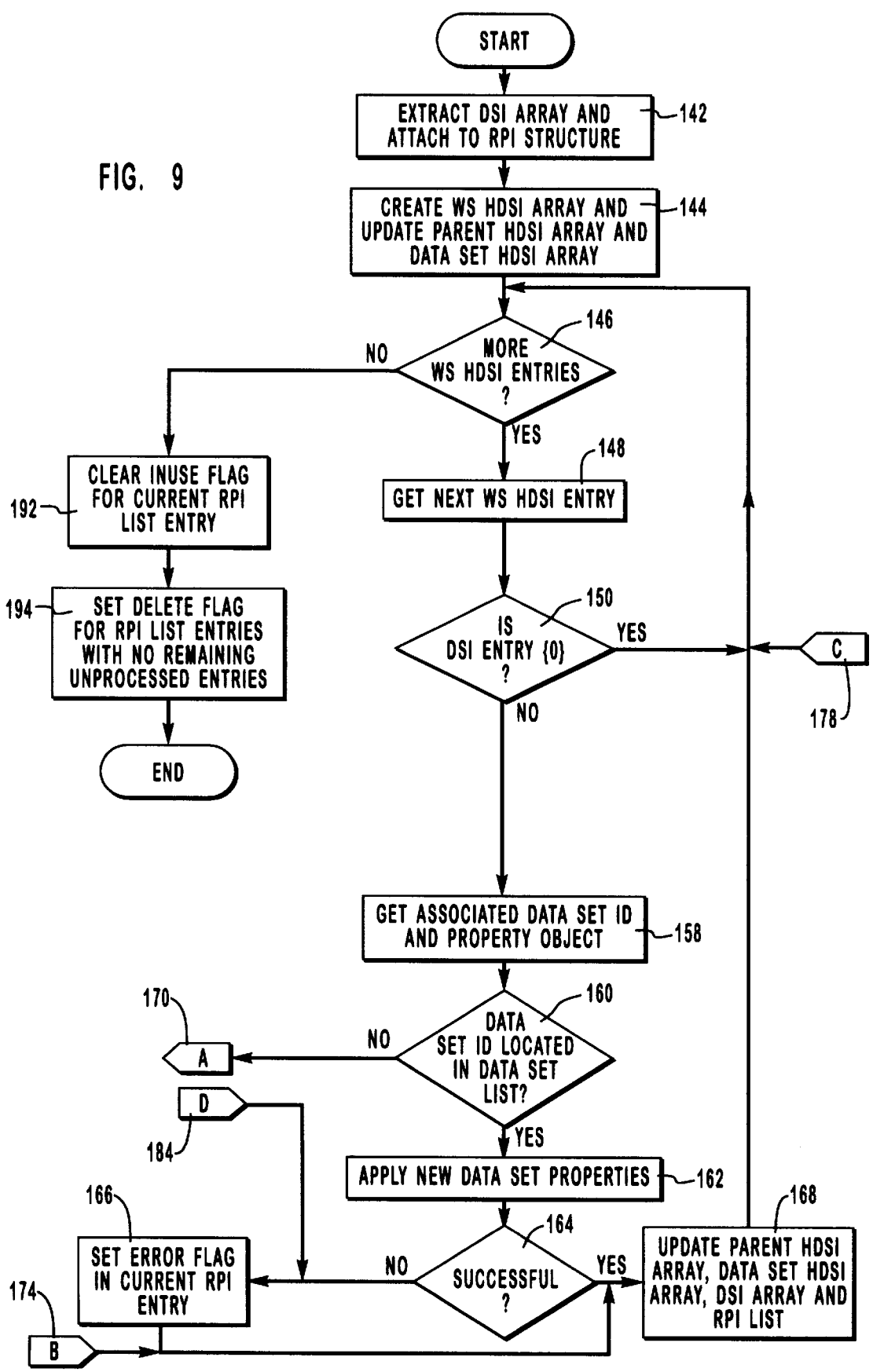
FIG. 9 is a flow diagram illustrating example processing of creates and modifies of hierarchically structured data in one embodiment of the present invention.

Referring first to FIG. 9, the first part of an example of create/modify processing is presented. As illustrated in FIG. 9, the first step, step 142, is to extract the DSI array and attach it to the RPI structure if not already part of the RPI structure. As discussed previously, an RPI entry may have the DSI array as part of the structure.

After the DSI array has been extracted, the next step is to create and/or update various types of tables or arrays that will be used in processing the DSI array entries. As previously explained, the DSI array has one entry for each create or modify change. These entries preferably comprise the data set ID of the data set being created or modified, the parent data set ID of the data set being created or modified, and an offset or pointer into the property object array where the properties of the data set being created or modified can be found.

The tables or arrays that will be used during processing of the DSI array are a working set HDSI (Handle to DSI) array or WS HDSI array, a parent HDSI array, and a data set HDSI array. The purpose of any entry in an HDSI type array is to identify one entry in one DSI array in one RPI list entry. Thus, an entry in any of the HDSI type arrays can be thought of as an index into a particular DSI arrayin a particular RPI entry. In order to index into a particular DSI array it is necessary to specify both the DSI array (or equivalently the RPI index of the associated RPI structure since the DSI array is attached to a specific RPI structure in the RPI list) and the entry in the DSI array. The index identifying which DSI array to use is necessary because there may be multiple DSI arrays in memory awaiting processing. The index pointing to the correct DSI array is called the HRPI (Handle to RPI), and the index pointing to the correct entry in the DSI array is simply called the Index.

Together the WS HDSI array, the parent HDSI array, and the data set HDSI array provide a sequence of indexes and tables that allow the entries of all DSI arrays in memory to be processed in top down fashion. Before proceeding to how these arrays act together to reconstruct a top down processing order, it may be useful to cover the basic purpose and the contents of each of these arrays.

The WS HDSI array is the array that determines the order in which the entries in all the DSI arrays are processed. As entries higher in the hierarchy are processed, entries lower in the hierarchy will be added to the bottom of this array so that they are processed in a top down fashion.

The parent HDSI array contains a global list of all DSI array entries of all DSI arrays in memory sorted first by parent data set ID and secondarily by data set ID. The Parent HDSI array allows quick identification of parent/child relationships. The data set HDSI array also contains a global list of all DSI array entries of all DSI arrays in memory. This global list contains, and is sorted by, the data set ID of each entry. Together these two global lists allow quick location of DSI entries pertaining to a particular data set or parent data set.

Prior to step 144, the WS HDSI array starts out empty, but the parent HDSI array and data set HDSI array may already have entries due to their global nature. Step 144 then converts each entry in the DSI array for the RPI structure about to be processed into an HDSI and adds the entries to the end of the WS HDSI array and into the parent HDSI array and data set HDSI array in the proper sort order.

After all appropriate tables have been created or updated, execution proceeds to decision block 146 where the actual processing begins. The processing of creates and modifies performed in the steps described below can be summarized as follows. An attempt is made to process an entry in a DSI array. If the processing cannot proceed because of a hierarchical dependence on another unprocessed change, then the entry is skipped in hopes that future processing will enable processing of this entry before the RPI structure times out and is removed. If the processing is successful, previously skipped DSI entries are reexamined to see if the change just processed has enabled the processing of other changes. The method utilizes a kind of dynamic reconstruction of the hierarchy where every change processed results in the processing of any unprocessed changes below it in the hierarchy.

Returning to FIG. 9, once the WS HDSI array has been created and initialized and the parent HDSI array and the data set HDSI array have been updated, execution proceeds to decision block 146, which determines if there are more entries in the WS HDSI array to process. If more entries remain, then execution proceeds to step 148 where the next entry of the WS HDSI is retrieved.

After the next WS HDSI entry is retrieved, decision block 150 tests whether the indexed DSI array entry is {0} (e.g., the entry has been zeroed as processed.) As explained below, as entries in the DSI arrays are processed, they are set to {0}. One of several circumstances may lead to an attempt to reprocess an already processed DSI array entry. As explained previously, processing a delete will zero any creates or modifies of the same data set. Another circumstance that can cause an entry to be zeroed is that, as explained below, when an entry is successfully processed, additional entries may be added to the end of the WS HDSI array. In certain circumstances this results in multiple WS HDSI array entries for the same DSI array entry. Checking for {0} entries allows these multiple entries to be processed appropriately. If the entry is {0}, then execution proceeds back to decision block 146 to retrieve the next entry.

If the DSI array entry is not {0}, then one of two situations must exist. Either the current data set exists and processing of the current change can proceed regardless of whether the parent exists or not, or the current data set does not exist either because it has already been deleted, because it is being created with this change or because no information exists about the parent data set. Step 158 and decision block 160 determine whether the current data set exists or not. Step 158 retrieves the data set ID and the property object of the data set. Decision block 160 determines if the data set ID is located in the data set list. Recall that the data set list is a list of all the data sets known at the replica node. If the data set ID is found in the data set list, then the data set exists and the change can be processed. This is illustrated in FIG. 9 by the "Y" branch of decision block 160. If the current data set does not exist, success in creating the data set will depend on whether the parent exists. This situation, illustrated by the "N" branch of decision block 160, is discussed below.

If the data set ID is found in the data set list, the change can be processed and the properties from the property object are applied to the data set list, as illustrated in FIG. 9 by step 162. More information about how data set properties are updated with new data set properties and about how to resolve conflicts that may arise between different versions of data set properties can be found in the copending Conflict Resolution Application, previously incorporated by reference. All that is required for this invention is that the data set properties be properly updated by step 162 so the most recent versions of the properties are used.

After the properties are applied, decision block 164 checks for unexpected errors. If an unexpected error occurs while applying the new properties, step 166 sets the Error flag on the RPI entry. As previously discussed, after all DSI entries have been processed, the Error flag will determine whether the change set associated with the RPI entry will be added to the local change set.

Whether an unexpected error occurs or not, the next step is to update the parent HDSI array, the data set HDSI array, the DSI array, and the RPI structure, which is illustrated in FIG. 9 by step 168. In step 168, the parent HDSI array and the data set HDSI arrays are updated by removing the entry just processed. Since these are global lists of all unprocessed entries, the entry just processed must be removed.

The DSI array is updated by zeroing the entry just processed. At first glance it may seem possible to remove the DSI array entry just processed. However, that would change the index value into the array for the remaining entries and require reindexing all the HDSI arrays, which results in increased processing. The preferred method is to simply zero the entry. This allows the system to determine whether the entry has been processed while at the same time avoiding the need to reindex every HDSI array.

Finally, the current RPI structure in the RPI list is updated. The RPI list is updated in two ways. Recall that each RPI structure has two counter values. One tells the total number of entries in the associated DSI array and the other tells how many DSI entries remain unprocessed. Since one entry was successfully processed, the unprocessed DSI entry count of the current RPI structure is decremented. After step 168, processing proceeds with decision block 146 where the next WS HDSI entry, if any, is processed.

Returning now to decision block 160. Recall that decision block 160 tests whether the data set ID of the current DSI entry exists in the local data set list. If the current data set ID does not exist in the local data set list, either it has already been deleted, in which case the entry does not need to be processed, or the entry needs to create the data set. The "N" branch of decision block 160 continues on FIG. 10 at off page connector 170.

Figure 10:
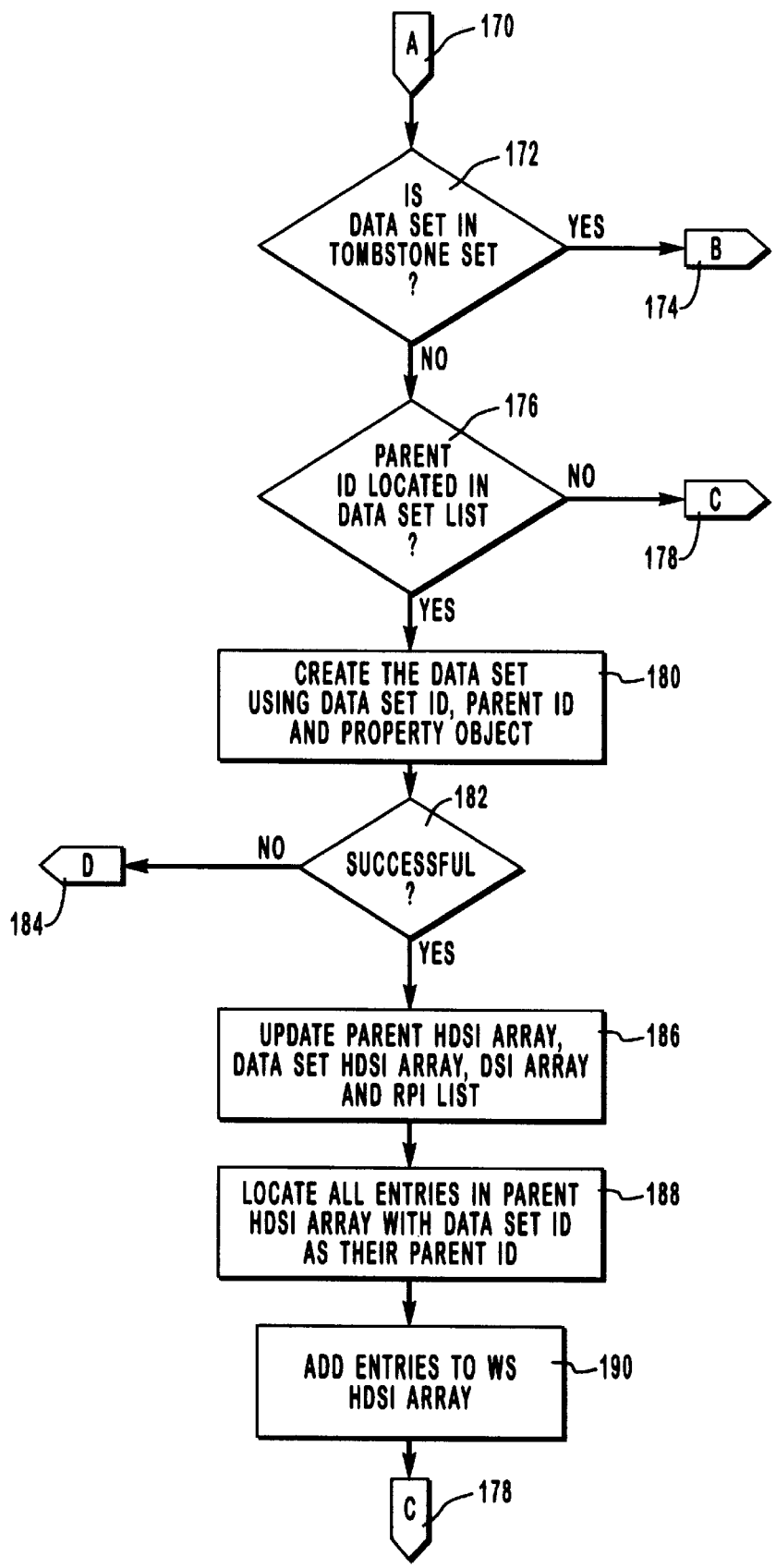
FIG. 10 is a continuation flow diagram illustrating example processing of creates and modifies of hierarchically structured data in one embodiment of the present invention.

Turning to FIG. 10, off page connector 170 leads to decision block 172. Decision block 172 tests whether the data set of the current DSI entry has already been deleted. As previously described, the change number and data set ID of every data set that is deleted is stored in a local tombstone set, such as tombstone set 56 of FIG. 3. If the data set ID of the current DSI entry is found in the tombstone set, then the data set has already been deleted. This is tested in decision block 172 of FIG. 10. If the data set has already been deleted, then execution returns, via off page connector 174, to step 168 of FIG. 9. Recall that this step updates the global HDSI tables, the DSI array, and the RPI list. Then,the next WS HDSI entry is processed.

If the data set ID is not in the tombstone set, then the data set needs to be created if possible. A data set can be created if the parent data set exists. Thus, decision block 176 checks to see if the parent data set exists by looking for the parent data set ID in the local data set list. If the parent data set does not exist, then processing is deferred until later. This is illustrated in FIG. 10 by the "N" branch of decision block 176. This branch leads, through off page connector 178, back to decision block 146 of FIG. 9. The entry in the DSI array is skipped and processing is postponed until later. As explained below, if DSI array entries remain unprocessed, the associated RPI structure is maintained in memory until it is either reprocessed or times out. If the parent data set exists, then the data set can be created. This is illustrated in FIG. 10 by step 180. The data set is created using the properties in the associated property object.

Decision block 182 of FIG. 10 tests whether an unexpected error occurred during the create. If an unexpected error occurs, processing continues with off page connector 184 which leads to step 166 of FIG. 9. This step sets the Error flag and then processing proceeds as described above. If the create is successful, step 186 then updates the parent HDSI array, the data set HDSI array, the DSI array, and the RPI list as explained in conjunction with step 168 of FIG. 9 above.

Since a data set was successfuilly created, changes that could not be processed before may now be processed. Put another way, the creation of a data set may allow the processing of changes whose processing has previously been deferred. Embodiments of the present invention can, thus, comprise means for reprocessing changes whose processing has previously been deferred. Any method that allows the entries to be reprocessed will work. For example, such means may comprise steps 188 and 190 of FIG. 10. As illustrated therein, step 188 locates all entries in the parent HDSI array where the data set ID that has just been created is the parent ID. Since the parent of these changes now exist, they can now be processed. Step 190 then takes the entries located in step 188 and adds them to the end of the WS HDSI array. These changes will, thus, be processed in due time through the process just described.

By appending entries to the end of the WS HDSI array as illustrated in steps 188 and 190 of FIG. 10, the changes are dynamically sorted in hierarchical order as they can be processed. This approach has been found to work better than trying to recreate the entire hierarchy before processing any changes, although such an approach could be used in the context of this invention.

Finally, returning for a moment to FIG. 9, the processing that occurs when no more entries remain in the WS HDSI array is discussed. As is apparent from the previous discussion, the above described procedure is repeated until there are no more entries in the WS HDSI array to process. This event is tested by decision block 146 of FIG. 9. The "N" branch of that decision block indicates that when there are no more entries in the WS HDSI array to be processed, step 192 then clears the InUse flag for the current RPI list entry. As previously explained, this will have the effect of keeping RPI structures whose DSI arrays have not been fully processed in memory until they either time out or are processed. After the InUse flag is cleared, the Delete flag is set on all the RPI list entries whose unprocessed DSI entry count is now zero. This will result in the eventual removal of these RPI structures.

Because the processing of the current RPI entry may have resulted in the processing of other RPI entries, the change set for any completely processed RPI entry must be added to the local change set (assuming that the Error flag is not set on the RPI entry). This step is illustrated in FIG. 6 by decision block 100, decision block 96, step 98, and step 102, since that is where execution continues after step 194. For this invention it is important to realize that in the case of hierarchical data whose processing may have enabled the processing of other data, decision block 100, decision block 96, step 98 and step 102 must pick up all RPI structures that have been emptied by the processing.

In order to illustrate the process of FIGS. 9 and 10 in greater detail, the following example will be used. Suppose that replica node A is creating a folder hierarchy. During the first replication interval replica node A creates folder F2 as a child of existing folder F1, creates folder F3 as a child of F2 and then renames folder F2 to F5. Assuming that FUID values are used as the required IDs and change numbers, this will result in sequence of changes such as:

create folder F2, data set ID A4, parent ID A2, change number A10 create folder F3, data set ID A12, parent ID A4, change number A13 rename folder F2 to F5, data set ID A4, parent ID A2, change number A20

In the above sequence, by renaming folder F2 to F5 change number A10 has been superseded by A20 so that change number A10 no longer exists. The change number of the folder with data set ID A4 has changed from A10 to A20 as the name property was modified. Since these changes occurred during the first replication interval, they will be broadcast in the same replication packet. At this point the folder hierarchy is:

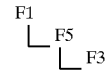

Now further assume that during the second replication interval, folder F7 was created as a child of F3. This will result in a change such as:

create folder F7, data set ID A30, parent ID A12, change number A35

This change will be sent in a separate replication packet since it occurred during the second replication interval. After all changes have been made, the hierarchy on replica node A is:

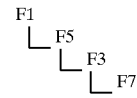

Thus, after all changes have been made on the replica nodes receiving the two replication packets, the hierarchy should be as indicated and the change numbers should be added to the local change set.

Assume that the two replication packets will be received by a replica node with the F1 folder already in existence. Further assume that second replication packet arrives first. This is a plausible scenario since replication packets are not guaranteed to arrive in any particular order. Referring to FIG. 9, steps 142 and 144 indicate that the DSI array is extracted and the WS HDSI array, the parent HDSI array and the data set HDSI array are created or update as appropriate. For the second replication packet the DSI array is:

DSI Array 1

| Data Set ID | Parent ID | Properties |
|---|---|---|
| A30 | A12 | F7 |

In the DSI array above, rather than an offset to the properties, the name is included since that is the only property we are interested in for this example. Assuming that no other unprocessed RPI structures exist, the WS HDSI array, the parent HDSI array and data set HDSI array are:

WS HDSI Array

| HRPI | Index |
|---|---|
| 1 | 1 |

Parent HDSI Array

| Parent ID | Data Set ID | HRPI | Index |
|---|---|---|---|
| A12 | A30 | 1 | 1 |

Data Set HDSI Array

| Data Set ID | HRPI | Index |
|---|---|---|
| A30 | 1 | 1 |

As previously mentioned the purpose of the HDSI arrays is to identify a specific entry in a specific DSI array. In the above WS HDSI array, the HRPI (Handle to Replication Packet Information structure) is the index into the RPI list that identifies the RPI structure where the DSI array can be found. In this case we are indexing DSI array 1 shown above. DSI array 1 has only a single entry that is indexed by the WS HDSI array.

Processing now continues in FIG. 9 with decision block 146. Since we have WS HDSI entries to process, we get the next entry as indicated by step 148. The WS HDSI entry leads us to the DSI array entry above, which is clearly not {0}. Execution then proceeds to steps 158 and decision block 160 check the data set ID and see if it already exists. In the example, the data set ID is A30 and it does not exist in the data set list. The only data set ID in the data set list is the preexisting folder F1 with a data set ID of A2. Execution then proceeds to decision block 172 of FIG. 10. Recall that this decision block tests whether the data set has already been deleted. Since this data set has not already been deleted, it will not exist in the local tombstone list. Execution then proceeds to decision block 176 which tests the existence of the parent data set.

Since the parent does not yet exist, the data set cannot be created. Execution, thus, proceeds back to decision block 146 of FIG. 9, which attempts to retrieve the next WS HDSI entry. Then, since there are no more entries in the WS HDSI array to process, execution proceeds with steps 192 and 194 of FIG. 9.

Step 192 clears the InUse flag of the current RPI list entry. Note that this has the effect of keeping the unprocessed entry that the system just attempted to process in the system until it can be processed or until it times out. Step 194 does not set the Delete flag since there is still an unprocessed DSI array entry. Note that, at this point, the system is done with the WS HDSI array and it can be destroyed or cleared, depending on the particular implementation.

Now suppose the first replication packet was received. The DSI array for this packet is:

DSI Array 2

| Data Set ID | Parent ID | Properties |
|---|---|---|
| A12 | A4 | F3 |
| A4 | A2 | F5 |

In the DSI array above, rather than an offset to the properties, the name is again included since that is the only property of interest for this example. Note also that folder F3 is listed before the parent folder F5 since the change number of F3 is lower than the change number of F5 (A13 vs. A20). In typical embodiments of store and forward replication, changes will be placed in the replication packet as they are found, which is typically lowest change number first.

After step 144 the WS HDSI array, the parent HDSI array and the data set HDSI array will be:

WS HDSI Array

| HRPI | Index |
|---|---|
| 2 | 1 |
| 2 | 2 |

Parent HDSI Array

| Parent ID | Data Set ID | HRPI | Index |
|---|---|---|---|
| A2 | A4 | 2 | 2 |
| A4 | A12 | 2 | 1 |
| A12 | A30 | 1 | 1 |

Data Set HDSI Array

| ata Set ID | HRPI | Index |
|---|---|---|
| A4 | 2 | 2 |
| A12 | 2 | 1 |
| A30 | 1 | 1 |

Note that the entries are sorted appropriately and that the new information has been added into the parent HDSI array and the data set HDSI array. Examination of the data set HDSI array and the parent HDSI array reveal that a single global array with two indexes into the array could also be used. One index would be keyed primarily by parent ID and secondarily by data set ID, while the other index would just be keyed by data set ID.

Execution then proceeds with step 148 since these are more WS HDSI array entries to process. The entry in the DSI array 2 indexed by the first WS HDSI entry is not {0} so execution proceeds step 158 to decision block 160. This decision block tests whether the data set exists or not. In this case data set A4 does not exist in the local data set list, so execution proceeds through decision block 172 (data set A4 has not been previously deleted) to decision block 176. Since the parent data set exists, execution proceeds to step 180 which creates the data set. After the create, the local data set list contains data sets A4 (folder F5) and A2 (folder F1).

After step 186 has updated the parent HDSI array, the data set HDSI array and DSI array 2, they include:

| DSI Array 2 | | |
|---|---|---|
| Data Set ID | Parent ID | Properties |
| A12 | A4 | F3 |
| 0 | 0 | 0 |

| Parent HDSI Array | | | |
|---|---|---|---|
| Parent ID | Data Set ID | HRPI | Index |
| A4 | A12 | 2 | 1 |
| A12 | A30 | 1 | 1 |

| Data Set HDSI Array | | |
|---|---|---|
| Data Set ID | HRPI | Index |
| A12 | 2 | 1 |
| A30 | 1 | 1 |

Furthermore, the unprocessed DSI entries of RPI structure 2 will have been decremented to 1.

Step 188 and 190 then locates all entries in the parent HDSI array with A4 as the parent and adds them to the WS HDSI array. An examination of the parent HDSI array above reveals that there is one entry with A4 as the parent, which is added to the WS HDSI array to obtain:

| WS HDSI Array | |
|---|---|
| HRPI | Index |
|  |  |
|  |  |
| 2 | 1 |

In the above WS HDSI array, the shaded entries represent entries either being processed or that have already been processed (the HRPI=2, Index=2 entry is the one that is currently being processed). After executing steps 188 and 190, execution then cycles back to the top of the processing loop of FIG. 9.

When the WS HDSI entry corresponding to the create of A12 (HRPI=2, Index=1) is next processed, a similar sequence of events will occur. Execution will proceed to step 180 where the A12 data set (folder F3) will be created. The local data set list will then contain three entries, A2 (folder F1), A4 (folder F5) and A12 (folder F3). Step 186 will then update the parent HDSI array, the data set HDSI array, and the DSI array to:

| DSI Array 2 | | |
|---|---|---|
| Data Set ID | Parent ID | Properties |
| 0 | 0 | 0 |
| 0 | 0 | 0 |

| Parent HDSI Array | | | |
|---|---|---|---|
| Parent ID | Data Set ID | HRPI | Index |
| A12 | A30 | 1 | 1 |

| Data Set HDSI Array | | |
|---|---|---|
| Data Set ID | HRPI | Index |
| A30 | 1 | 1 |

Note, at this point, that all the entries in DSI array 2 have been processed. However, the global HDSI arrays indicate that there are still unprocessed changes in memory. This is the change in DSI array 1 that we previously skipped. This change will be picked up in this example when steps 188 and 190 are executed. In these steps, all the entries with a parent of A12 (the data set just added) will be added back into the WS HDSI array. After the addition of the change from DSI array 1, the WS HDSI array contains:

| WS HDSI Array | |
|---|---|
| HRPI | Index |
|  |  |
|  |  |
|  |  |
| 1 | 1 |

Again the shaded entries represent entries already processed with the HRPI=2, Index=1 entry being the A12 entry just processed.

Execution will then cycle back to decision block 146 of FIG. 9 and down to step 180 where the final folder, F.7 will be added by creating data set A30. Step 186 will zero the entry of DSI array 1, and steps 188 and 190 will fail to find any remaining entries to be processed. No more entries will be added to the WS HDSI array. At this point all data sets have been created, with the proper hierarchical structure.

Execution then proceeds at step 192 of FIG. 9, which clears the InUse flag for RPI structure 2. Step 194 then scans the RPI list for structures with no remaining entries to be processed. In this case both RPI structure 1 and RPI structure 2 have no remaining entries. The Delete flag is, therefore, set on both these structures and, in due time, they will be removed along with their associated replication packets. The change sets are also added to the local change set as indicated by decision block 100, decision block 96, and step 102 of FIG. 6.

This example illustrates how a top-down processing order can be recreated by adding changes relating to child data sets to the end of the WS HDSI array after the parent data set is processed.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a replication enterprise comprising a plurality of replica nodes, each having a copy of a plurality of replica objects that have a hierarchical relationship, and each of which may make changes to the replica objects that affect the hierarchical relationship and each of which replicates changes to other replica nodes without enforcing any particular chronological order, a method of replicating changes made to the replica objects among the replica nodes so that the hierarchical relationship of the replica objects are properly preserved at each replica node independent of the chronological order in which the changes are received, the method comprising the steps of:

receiving, at a local node via networking neans, a plurality of one-way unacknowledged replication packets which together comprise a plurality of changes to at least one of the replica objects, at least one of said changes having a hierarchical dependence on at least one other change so that the changes must be processed in a designated hierarchical order independent of any received chronological order if the hierarchical relationship between the replica objects is to be properly preserved on said local node;

storing said received replication packets in an incoming packet store so the received replication packets will be available for processing;

selecting a replication packet from the incoming packet store for processing;

for each change in the elected replication packet, performing the steps of:

selecting a change to process based on a designated criteria that selects chances according to a plurality of change types;

if said selected change has a hierarchical dependence on another change that has not yet been processed, then deferring processing of the selected change and selecting another change to process;

if said selected change does not have a hierarchical dependence on another change that has not yet been processed, then (a) processing the change and then (b) processing any changes whose processing was deferred due to a dependence on the change just processed and then (c) selecting another change to process.

2. A method of replicating hierarchically structured data as recited in claim 1 wherein the replication packets in the incoming packet store are selected for processing based on a priority that is dependent on the type of replication packet.

3. A method of replicating hierarchically structured data as recited in claim 1 wherein received replication packets containing hierarchically dependent changes are assigned a timeout value and wherein the method further comprises the step of removing any replication packet whose timeout value has been exceeded before the replication packet is processed.

4. A method of replicating hierarchically structured data as recited in claim 1 wherein change identifiers are associated with the changes in said received replication packets that uniquely identify said changes and wherein the method further comprises the step of adding change identifiers associated with changes successfully processed to a change set comprising the change identifiers of all changes made locally or received via replication packets and successfully processed.

5. A method of replicating hierarchically structured data as recited in claim 1 wherein the changes contained in a replication packet comprise deletion of replica objects, creation of replica objects, or modification of replica objects and wherein the step of selecting a change to process selects any changes deleting replica objects for processing before selecting changes modifying or creating replica objects for processing.

6. A method of replicating hierarchically structured data as recited in claim 5 further comprising the step of processing a change that attempts to delete a parent replica object with at least one undeleted child replica object by first promoting said at least one child replica object to the same level as the parent replica object and then deleting the parent replica object.

7. In a replication enterprise comprising a plurality of replica nodes, each having a copy of a plurality of replica objects flat have a hierarchical relationship, and each of which may make changes to the replica objects that affect the hierarchical relationship and each of which replicates changes to other replica nodes without enforcing any particular chronological order, a method of replicating changes made to the replica objects among the replica nodes so that the hierarchical relationship of the replica objects are properly preserved at each replica node independent of the chronological order in which the changes are received, the method comprising the steps of:

receiving, at a local node via networking means, a plurality of one-way unacknowledged replication packets which together comprise a plurality of changes to at least one of the replica objects, at least one of said changes having a hierarchical dependence on at least one other change so that the changes must be processed in a designated hierarchical order independent of any received chronological order if the hierarchical relationship between the replica objects is to be properly preserved on said local node;

storing received replication packets in an incoming packet store so the received replication packets will be available for processing;

selecting a replication packet from the incoming packet store for processing;

creating an information object associated with said selected replication packet, said information object comprising an entry corresponding to each change in said selected replication packet so that processing each entry in said information object will result in processing each change of said selected replication packet; and for each entry in the information object performing the steps of:

selecting an entry for processing based on the type of change that corresponds to said entry;

attempting to process the entry in the information object; and if the entry could not be processed due to a hierarchical dependence on unprocessed changes, then deferring processing of the change corresponding to the entry in the information object.

8. A method of replicating hierarchically structured data as recited in claim 7 further comprising the step of retaining the information object if any entries remain unprocessed due to a hierarchical dependence on unprocessed information.

9. A method of replicating hierarchically structured data as recited in claim 8 further comprising the step of selecting another replication packet for processing and creating an associated information object when no more entries remain in existing information objects that can be processed.

10. A method of replicating hierarchically structured data as recited in claim 9 further comprising the step of processing any entries whose processing had been previously deferred due to a hierarchical dependence on unprocessed changes once the information object causing the hierarchical dependence on unprocessed changes has been successfully processed.

11. A method of replicating hierarchically structured data as recited in claim 10 further comprising the steps of assigning a timeout value to said information object and removing said information objects when the timeout value is exceeded.

12. A method of replicating hierarchically structured data as recited in claim 11 wherein the step of removing said information object when the timeout value is exceeded also removes the replication packet associated with said timed out information object.

13. A method of replicating hierarchically structured data as recited in claim 11 further comprising the step of not removing an information object whose timeout value has been exceeded if entries in the information object are currently being processed.

14. A method of replicating hierarchically structured data as recited in claim 13 further comprising the step of not removing any other information object whose timeout value has been exceeded if said any other information object has entries that have a hierarchical relationship to entries of the information object whose entries are being processed.

15. A method of replicating hierarchically structured data as recited in claim 14 further comprising the step of adding a unique change identifier for each successfully processed change, to a locally stored change set comprising changes made locally and changes that have been successfully processed and that were received via replication packets.

16. A method of replicating hierarchically structured data as recited in claim 15 wherein replication packets containing changes to replica objects that have a hierarchical dependence on other replica objects are processed before changes to replica objects that have no such hierarchical dependence.

17. A method of replicating hierarchically structured data as recited in claim 7 further comprising the step of processing entries in said information object that correspond to deletion of hierarchically structured replica objects before processing entries in said information object that correspond to creation or modification of hierarchically structured replica objects.

18. A method of replicating hierarchically structured data as recited in claim 17 wherein the step of deferring processing of entries only defers processing if such entries correspond to creation or modification of hierarchically structured replica objects.

19. A method of replicating hierarchically structured data as recited in claim 18 further comprising the step of processing entries that attempt to delete a parent replica object having at least one undeleted child replica object by promoting said at least one undeleted child replica object to the level of the parent replica object and then deleting the parent replica object.

20. A method of replicating hierarchically structured data as recited in claim 19 further comprising the step of processing each deleted replica object by adding a replica object ID that uniquely identifies the deleted replica object and a change identifier that uniquely identifies the change that caused deletion of the deleted replica object to a local tombstone set comprising replica object IDs and change identifiers for all deleted replica objects.

21. A method of replicating hierarchically structured data as recited in claim 20 further comprising the step of processing entries attempting to delete a replica object that does not exist locally by adding a replica object ID and a change identifier associated with said nonexistent replica object to said local tombstone set.

22. In a replication enterprise comprising a plurality of replica nodes, each having a copy of a plurality of replica objects that have a hierarchical relationship, and each of which may make changes to the replica objects that affect the hierarchical relationship and each of which replicates changes to other replica nodes without enforcing any particular chronological order, a method of replicating changes made to the replica objects among the replica nodes so that the hierarchical relationship of the replica objects are properly preserved at each replica node independent of the chronological order in which the changes are received, the method comprising the steps of:

receiving, at a local node via networking means, a plurality of one-way unacknowledged replication rackets which together comprise a plurality of changes to at least one of the replica objects, at least one of said changes having a hierarchical dependence on at least one other change so that the changes must be processed in a designated hierarchical order independent of any received chronological order if the hierarchical relationship between the replica objects is to be properly preserved on said local node;

storing received replication packets in an incoming packet store so the received replication packets will be available for processing;

selecting a replication packet from the incoming packet store for processing;

creating an information object associated with said selected replication packet, said information object comprising an entry corresponding to each change in said selected replication packet so that processing each entry in said information object will result in processing each change of said selected replication packet;

associating a timeout value with said information object so that when said timeout value is exceeded, the information object can be removed;

processing entries in the information object corresponding to deletion of replica objects by performing the following steps:

processing all entries that delete replica objects that have no undeleted child replica objects; and processing all entries that delete parent replica objects that have undeleted child replica objects by first promoting undeleted child replica objects to the level of their parent replica object and then deleting the parent replica object;

processing entries in the information object corresponding to creation or modification of replica objects by performing the following steps:

attempting to process the entry in the information object;

if the entry could not be processed due to a hierarchical dependence on unprocessed changes, then deferring processing of the change corresponding to the entry in the information object; and if the entry is successfully processed, then processing any entries whose processing was previously deferred and that have a hierarchical dependence on the entry successfully processed;

when no processible entries remain in the information object, selecting another replication packet for processing and creating another information object associated with said another replication packet.

23. In a computer system defining a location in a replication enterprise where replica objects are replicated among a plurality of such computer systems connected together by networking means without enforcing any particular chronological order so that changes made to one copy of a replica object on one system are reflected in other copies of the replica object on other systems through the replication, receipt, and processing of such changes, an article of manufacture comprising:

program storage means for storing program code means, said program storage means adapted for access by a local computer system so that said program code means can be provided to a CPU of said local computer system, said program code means comprising:

replication packet store means for storing incoming replication packets until said incoming replication packets can be processed;

means for selecting a replication packet from the replication packet store means for processing;

means for selecting a change to process according to a plurality of change types so that changes of one type are processed before changes of another type;

means for processing changes in said selected replication packet that correspond to creation of hierarchically structured replica objects, said means for processing comprising:

means for deferring processing of changes that cannot be processed due to a hierarchical dependence on unprocessed changes and for retaining such unprocessible changes until a future time when they may be processed because the changes on which they depend have been processed; and means for reprocessing changes whose processing has been previously deferred due to a hierarchical dependence on unprocessed changes, and whenever a change is successfully processed, said means for reprocessing changes operating to locate previously deferred changes that have a hierarchical dependence on said successfully processed change and to place such previously deferred changes in condition for processing.

24. An article of manufacture as recited in claim 23 wherein the means for selecting a replication packet for processing comprises means for prioritizing the replication packets so they are selected based on a predetermined priority scheme.

25. An article of manufacture as recited in claim 23 further comprising means for assigning a timeout value to the changes in the received replication packets.

26. An article of manufacture as recited in claim 25 further comprising means for removing replication packets whose timeout values have been exceeded.

27. An article of manufacture as recited in claim 23 further comprising means for creating at least one information object associated with each received replication packet, said at least one information object comprising an entry for each change in its associated replication packet so that processing each entry in said at least one information object will result in processing each change of said associated replication packet.

28. An article of manufacture as recited in claim 23 further comprising means for storing a change set comprising a list of changes that have been successfully processed.

29. An article of manufacture as recited in claim 23 wherein the means for processing changes in said selected replication packet that correspond to creation of hierarchically structured replica objects also processes changes in said selected replication packet that correspond to modification of hierarchically structured replica objects.

30. An article of manufacture as recited in claim 23 further comprising means for processing changes relating to deletion of replica objects comprising:

means for deleting a parent replica object without undeleted child replica objects, that first deletes said parent replica object and then enters a unique replica object identifier and a unique change identifier, each associated with said deleted parent replica object, into a tombstone set comprising replica object identifiers and change identifiers for all deleted replica objects; and means for deleting a parent replica object with at least one undeleted child replica object, that first promotes said at least one child replica object and then deletes said parent replica object and enters a unique replica object identifier and a unique change identifier, each associated with said deleted parent replica object, into a tombstone set comprising replica object identifiers and change identifiers for all deleted replica objects.

31. In a computer system defining a location in a replication enterprise where replica objects are replicated among a plurality of such computer systems connected together by networking means without enforcing any particular chronological order so that changes made to one copy of a replica object on one system are reflected in other copies of the replica object on other systems through the replication, receipt, and processing of such changes, an article of manufacture comprising:

program storage means for storing program code means, said program storage means adapted for access by a local computer system so that said program code means can be provided to a CPU of said local computer system, said program code means comprising:

replication packet store means for storing incoming replication packets until said incoming replication packets can be processed;

means for selecting a replication packet from the replication packet store means for processing;

means for creating at least one information object associated with said selected replication packet, said at least one information object comprising an entry for each change in said selected replication packet so that processing each entry in said at least one information object will result in processing each change of said selected replication packet;

means for selecting an entry in said at least one information object to process according to a plurality of change types so that entries that correspond to changes of one type are processed before entries that correspond to changes of another type;

means for processing entries in said at least one information object that correspond to creation of hierarchically structured replica objects, said means for processing comprising:

means for deferring processing of entries in said at least one information object that cannot be processed due to a hierarchical dependence on unprocessed changes and for retaining such unprocessible entries until a future time when they may be processed because the changes on which they depend have been processed; and means for reprocessing entries in said at least one information object whose processing had been previously deferred due to a hierarchical dependence on unprocessed changes, and whenever an entry in an information object is successfully processed, said means for reprocessing entries operating to locate previously deferred entries that have a hierarchical dependence on said successfully processed entries and to place such previously deferred entries in condition for processing.

32. An article of manufacture as recited in claim 31 wherein the means for processing entries in said at least one information object that correspond to creation of hierarchically structured replica objects, also processes entries in said at least one information object that correspond to modification of hierarchically structured replica objects.

33. An article of manufacture as recited in claim 31 further comprising means for associating a timeout value with said at least one information object.

34. An article of manufacture as recited in claim 33 further comprising means for removing said at least one information object and its associated replication packet when said timeout value has been exceeded.

35. An article of manufacture as recited in claim 34 further comprising means for preventing the timeout and removal of information objects with entries that are being processed.

36. An article of manufacture as recited in claim 35 wherein such means for preventing the timeout and removal of information objects with entries that are being processed will prevent the timeout and removal of any hierarchically related information objects if one such hierarchically related information object has entries that are being processed.

37. An article of manufacture as recited in claim 36 further comprising means for processing entries in said at least one information object relating to deletion of replica objects comprising:

means for deleting a parent replica object without undeleted child replica objects, that first deletes said parent replica object and then enters a unique replica object identifier and a unique change identifier, each associated with said deleted parent replica object, into a tombstone set comprising replica object identifiers and change identifiers for all deleted replica objects; and means for deleting a parent replica object with at least one undeleted child replica object, that first promotes said at least one child replica object and then deletes said parent replica object and enters a unique replica object identifier and a unique change identifier, each associated with said deleted parent replica object, into a tombstone set comprising replica object identifiers and change identifiers for all deleted replica objects.

* * * * *

UNITED STATES PATENT AND TRADEMARK OFFICE
CERTIFICATE OF CORRECTION

PATENT NO. : 5,812,773

DATED : Sep. 22, 1998

INVENTOR(S) : Scott Norin

It is certified that error appears in the above-identified patent and that said Letters Patent is hereby corrected as shown below:

Title page, second column, after "Attorney, Agent, or Firm" change "Workman Nydegger Seeley" to --Workman, Nydegger & Seeley--

Col. 5, line 58, after "that" change "have" to --has--

Col. 6, line 5, after "copy" change "ofthe" to --of the--

Col. 9, line 60, after "comprising" change "programs" to --program--

Col. 14, line 25, after "Summary of" change "Discoveay" to --Discovery--

Col. 14, line 44, after "Backfill Application" insert a right parenthesis

Col. 24, line 2, after "when" insert --the--

Col. 24, line 8, before "values" change "timout" to --time-out--

Col. 24, line 10, before both "values" change "timout" to --time-out--

Col. 24, line 12, before "values" change "timout" to --time-out--

Col. 24, line 16, before "values" change "timout" to --time-out--

Col. 24, line 19, before "value" change "timout" to --time-out--

Col. 25, line 43, after "been" change "fuilly" to --fully--

Col. 31, line 17, after "core" change "fimcitionally" to --functionality--

Col. 31, line 60, before "after" delete "The"

UNITED STATES PATENT AND TRADEMARK OFFICE
CERTIFICATE OF CORRECTION

PATENT NO. : 5,812,773
DATED : Sep. 22, 1998
INVENTOR(S) : Scott Norin

It is certified that error appears in the above-identified patent and that said Letters Patent is hereby corrected as shown below:

Col. 32, line 24, after "situation" change "candevelop" to --can develop--

Col. 32, line 47, after "DSI" change "arrayin" to --array in--

Col. 35, line 31, before "created" change "successfuilly" to --successfully--

Col. 36, line 63, before "second" insert --the--

Col. 37, line 44, before "158" change "steps" to --step--

Col. 37, line 45, after "160" change "check" to --checks--

Col. 37, line 45, after "and" change "see" to --sees--

Col. 38, line 57, after "proceeds" insert --through--

Col. 40, line 20, after "final folder" change "F.7" to --F7--

Col. 41, line 63, after "objects" change "flat" to --that--

Signed and Sealed this

Fifteenth Day of February, 2000

Attest:

Q. TODD DICKINSON

*Attesting Officer*     *Commissioner of Patents and Trademarks*